(12) United States Patent
Moir

(10) Patent No.: US 7,395,382 B1
(45) Date of Patent: Jul. 1, 2008

(54) HYBRID SOFTWARE/HARDWARE TRANSACTIONAL MEMORY

(75) Inventor: Mark S. Moir, Somerville, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 483 days.

(21) Appl. No.: 10/915,502

(22) Filed: Aug. 10, 2004

(51) Int. Cl.
G06F 12/14 (2006.01)
G06F 12/10 (2006.01)
G06F 13/14 (2006.01)

(52) U.S. Cl. .................. 711/147; 711/150; 711/163
(58) Field of Classification Search ............... None
See application file for complete search history.

(56) References Cited

U.S. PATENT DOCUMENTS

| | | | |
|---|---|---|---|
| 4,584,640 | A | 4/1986 | MacGregor et al. |
| 4,847,754 | A | 7/1989 | Obermarck et al. |
| 5,224,215 | A | 6/1993 | Disbrow |
| 5,319,778 | A | 6/1994 | Catino |
| 5,428,761 | A | 6/1995 | Herlihy et al. |
| 6,128,710 | A | 10/2000 | Greenspan et al. |
| 6,144,965 | A | 11/2000 | Oliver |
| 6,178,423 | B1 | 1/2001 | Douceur et al. |
| 6,360,219 | B1 | 3/2002 | Bretl et al. |
| 6,360,220 | B1 | 3/2002 | Forin |
| 6,366,932 | B1 | 4/2002 | Christenson |
| 6,460,124 | B1 * | 10/2002 | Kagi et al. .................. 711/163 |
| 6,581,063 | B1 | 6/2003 | Kirkman |
| 6,651,146 | B1 | 11/2003 | Srinivas et al. |
| 6,826,757 | B2 | 11/2004 | Steele, Jr. et al. |
| 2001/0047361 | A1 | 11/2001 | Martin et al. |
| 2003/0079094 | A1* | 4/2003 | Rajwar et al. .................. 711/150 |
| 2003/0140085 | A1 | 7/2003 | Moir et al. |
| 2003/0174572 | A1 | 9/2003 | Moir et al. |
| 2003/0182462 | A1 | 9/2003 | Moir et al. |
| 2003/0182465 | A1 | 9/2003 | Moir et al. |
| 2004/0015510 | A1 | 1/2004 | Moir et al. |

(Continued)

FOREIGN PATENT DOCUMENTS

EP 0 366 585 5/1990

(Continued)

OTHER PUBLICATIONS

Herlihy, M.P., et al., "Linearizability: A Correctness Condition For Con-Current Objects," *ACM Transactions On Programming Languages and Systems*, 12(3):463-492, Jul. 1990.

(Continued)

*Primary Examiner*—Hyung S. Sough
*Assistant Examiner*—Duc T. Doan
(74) *Attorney, Agent, or Firm*—Robert C. Kowert; Meyertons, Hood, Kivlin, Kowert & Goetzel, P.C.

(57) ABSTRACT

A transactional memory implementation has been developed that is capable of coordinating concurrent hardware transactional memory (HTM) and software transactional memory (STM) transactions over a unified transactional memory space. Some implementations employ hardware transactional memory, if available or suitable, to improve performance. Some exploitations include a hardware transactional memory in which, or for which, hardware-mediated transactions are augmented to include within their transactional scope (or mechanism) one or more additional transactional locations that facilitate coordination with concurrently executing software-mediated transactions (if any).

53 Claims, 5 Drawing Sheets

U.S. PATENT DOCUMENTS

| | | | |
|---|---|---|---|
| 2004/0015642 | A1 | 1/2004 | Moir et al. |
| 2004/0034673 | A1 | 2/2004 | Moir et al. |
| 2004/0068597 | A1* | 4/2004 | Kulick et al. ............... 710/240 |
| 2004/0153687 | A1 | 8/2004 | Moir et al. |
| 2004/0237073 | A1* | 11/2004 | Wu et al. .................... 717/154 |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Herlihy, M.P., "Wait-Free Synchronization," *ACM Transactions On Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps.gz].

Bershad, B. N., "Practical Considerations For Non-Blocking Concurrent Objects," *Proceedings 13th IEEE International Conference on Distributed Computing Systems*, pp. 264-273. IEEE Computer Society Press, Washington, D.C., 1993.

Herlihy, M., "A Methodology For Implementing Highly Concurrent Data Objects," *ACM Transactions on Programming Languages and Systems*, 15(5):745-770, Nov. 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization And Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Arora, N. S., et al., "Thread Scheduling For Multiprogrammed Multiprocessors," *Proceedings of the 10th Annual ACM Symposium on Parallel Algorithms and Architectures*, pp. 119-129, ACM Press, New York, NY, 1998.

Attiya, Hagit, et al., "Atomic Snapshots in O(n log n) Operations," *SIAM Journal on Computing*, 27(2):319-340, Apr. 1998.

Greenwald, M., "Non-Blocking Synchronization and System Design," PhD thesis, Stanford University Technical Report STAN-CS-TR-99-1624, Palo Alto, CA, Aug. 1999, 241 pages.

Agesen, Ole, et al.: "DCAS-Based Concurrent Deques," *SPAA 2000. Proceedings of the 12th Annual ACM Symposium on Parallel Algorithms and Architectures*, pp. 137 146, ACM Press, New York, NY, ISBN: 1-58113-185-2, 2000.

Detlefs, David L., et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.

Herlihy, Maurice, et al., "Software Transactional Memory for Dynamic-Sized Data Structures," Sun Microsystems, Inc. PODC '03, Jul. 13-16, 2003, Boston Massachusetts, pp. 92-101.

Dice, Dave and Garthwaite, Alex, "Mostly Lock-Free Malloc," in ACM SIGPLAN International Symposium on Memory Management, ACM Press, 2002, pp. 163-174.

Doherty, et al., "Bringing Practical Lock-Free Synchronization to 64-Bit Applications," POCD '04, Jul. 25-28, 2004, St. John's. Newfoundland, Canada, 9 pages.

Greenwald, M., "Non-Blocking Synchronization and System Design," PhD Thesis, Stanford University Technical Report STAN-CS-TR-99-1624, Palo Alco, CA, Aug. 1999, 241 pages.

Harris, T. and Fraser, K., "Language Support for Lightweight Transactions" in Proceedings of the 16th Annual ACM SIGPLAN Conference on Object-Oriented Programming Systems, Languages, and Applications (2003), 15 pages.

Harris, Timothy L., et al., "A Practical Multi-Word Compare-and-Swap Operation," in Proceedings of the 16th International Symposium on Distributed Computing, 2002, 15 pages.

Hendler, et al., "A Scalable Lock-free Stack Algorithm," SPAA '04, Jun. 27-30, Barcelona, Spain, pp. 206-215.

Herlihy, M. and Moss, J., "Transactional Memory: Architectural Support for Lock-Free Data Structures," in Proceedings of the 20th International Symposium in Computer Architecture, (1993) pp. 289-300.

Herlihy, M., et al., "Obstruction-Free Snychronization: Double-Ended Queues as an Example," in Proceedings of the 23rd International Conference on Distributed Computing Systems, 2003, 8 pages.

Lev, Yossi and Moir, Mark, "Fast read sharing mechanism for software transactional memory," 23rd Annual ACM SIGACT-SIGOPS Symposium on Principles of Distributed Computing (PODC 2004) poster presentation, Jul. 2004, 6 pages.

Michael, M. and Scott, M., "Nonblocking algorithms and preemption-safe locking on multiprogrammed shared memory multiprocessors," Journal of Parallel and Distributed Computing, 51(1):1-26, 1998.

Moir, et al., "A Scalable and Lock-Free FIFO Queue Algorithm," Aug. 9, 2004, 10 pages.

Moir, M., "Laziness Pays! Using Lazy Synchronization Mechanisms to Improve Non-Blocking Constructions," in Proceedings of the 19th annual ACM Symposium on the Principles of Distributed Computing (2000), pp. 61-70.

Moir, M., "Practical Implementations of Non-Blocking Synchronization Primitives," in Proceedings of the 16th Annual ACM Symposium on Principles of Distributed Computing (1997), pp. 219-228.

Shavit, N. and Touitou, D., "Software Transactional Memory," Distributed Computing, Special Issue (10):99-116 (1997).

Afek, Yehuda, "Atomic Snapshots of Shared Memory," Journal of the ACM, vol. 40, No. 4, pp. 873-890, 1993.

Agesen, Ole at el., "An Efficient Meta-Lock for Implementing Ubiquitous Synchronization," ACM SIGPLAN Notices, vol. 34, No. 10, pp. 207-222, Oct. 1999.

Anderson, James H. et al., "Universal Constructions for Large Objects," *IEEE Transactions on Parallel and Distributed Systems*, vol. 10, No. 12, pp. 1317-1332, 1999.

Attiya, Hagit et al., "An Adaptive Collect Algorithm with Applications," *Distributed Computing*, vol. 15, No. 2, pp. 87-96, Apr. 2002.

Barnes, G., "A Method for Implementing Lock-Free Shared Data Structures," *Proceedings of the 5th ACM Symposium on Parallel Algorithms and Architectures*, pp. 261-270, ACM Press, New York, NY 1993.

Goodman, James R., et al., "Efficient Synchronization Primitives for Large-Scale Cache-Coherent Multiprocessors," *Proceedings of the Third International Conference on Architectural Support for Programming Languages and Operating Systems*, pp. 64-75, ACM Press, New York, NY 1989.

Harris, T., et al., "Language Support for Lightweight Transactions," *Proc. 18th Annual ACM SIGPLAN Conf. on Object-Oriented Programming Systesm, Languages, and Applications*, pp. 388-402, ACM Press, New York, NY, 2003.

Hendler, Danny, et al., "A Scalable Lock-Free Stack Algorithm," *Proceedings of the 16th Annual ACM Symposium on Parallelism in Algorithms and Architectures*, pp. 206-215, ACM Press, New York, NY, 2004.

Herlihy, M., et al., "Transactional Memory: Architectural Support for Lock-Free Data Structures," *Proc. 20th International Symposium in Computer Architecture*, pp. 289-300, IEEE Computer Society, Washington, D.C., 1993.

Herlihy, Maurice, "Dynamic-Sized Lockfree Data Structures," Sun Microsystems Technical Report SMLI TR-2002-112, Jun. 2002.

Herlihy, Maurice et al., "The Repeat Offender Problem: A Mechanism for Supporting Dynamic-Sized Lock-Free Data Structures," Sun Microsystems Technical Report SMLI TR-2002-112, Jun. 2002.

Herlihy, Maurice et al., "Obstruction-Free Synchronization: Double-Ended Queues as an Example," *Proceedings of the 23rd International Conference on Distributed Computing*, p. 522, IEEE Computer Society, Washington, D.C., 2003.

Lamport, Leslie, "A Fast Mutual Exclusion Algorithm," ACM *Transactions on Computer Systems*, vol. 5, No. 1, pp. 1-11, 1987.

Luchangco, Victor et al., "Nonblocking k-compare-single-swap," *Proceedings of the 15th Annual ACM Symposium on Parallel Algorithms and Architectures*, pp. 314-323, ACM Press, New York, NY, 2003.

Michael, Maged M. et al., "Non-Blocking Algorithms and Preemption Safe Locking on Multiprogrammed Shared Memory Multiprocessors," *Journal of Parallel and Distributed Computing*, vol. 51, No. 1, pp. 1-26, May 25, 1998.

Michael, Maged M. et al., "Safe Memory Reclamation for Dynamic Lock-Free Objects Using Atomic Reads and Writes," *Proceedings of the 21st Annual ACM Symposium on the Principles of Distributed Computing*, pp. 21-30, ACM Press, New York, NY, 2002.

Michael, M., "Scalable Lock-Free Dynamic Memory Allocation," *Proceedings of the ACM SIGPLAN 2004 Conference on Programming Language Design and Implementation*, pp. 34-46, ACM Press, New York, NY, 2004.

Moir, Mark et al., "Wait-Free Algorithms for Fast, Long-Lived Renaming," *Science of Computer Programming*, vol. 25, No. 1, pp. 1-39, Aug. 1995.

Moir, Mark, "Practical implementation of non-blocking synchronization primitives," *Proceedings of the Sixteenth Annual ACM Symposium on Principles of Distributed Computing*, pp. 219-228, ACM Press, New York, NY, 1997.

Moir, Mark, "Transparent Support for Wait-Free Transactions," *Proceedings of the 11th International Workshop on Distributed Algorithms*, pp. 305-319, Springer-Verlag, London, UK, 1997.

Moir, Mark, "Laziness Pays! Using Lazy Synchronization Mechanisms to Improve Non-Blocking Constructions," *Proc. 19th Annual ACM Symposium on Principles of Distributed Computing*, pp. 61-70, ACM Press, New York, NY, 2000.

Shavit, N., et al., "Software Transactional Memory," *Distributed Computing*, vol. 10, No. 2, pp. 99-116, Feb. 1997.

Stroustrup, Bjarne, *The C++ Programming Language*, Third Edition, pp. 461-497, Reading, Mass., Addison-Wesley, 1997.

Goetz, Brian, "A First Look at JSR 166: Concurrency Utilities," Mar. 1, 2004. [URL: http://today.java.net/lpt/a/76].

U.S. Appl. No. 09/547,288, filed Apr. 11, 2000 and naming as inventor(s) Shavit et al.

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlefs et al.

U.S. Appl. No. 10/653,828, filed Sep. 3, 2003 and naming as inventor(s) Martin et al.

U.S. Appl. No. 10/669,948, filed Sep. 24, 2003 and naming as inventor(s) Dice et al.

U.S. Appl. No. 10/670,495, filed Sep. 24, 2003 and naming as inventor(s) Shavit et al.

U.S. Appl. No. 10/894,828, filed Jul. 20, 2004 and naming as inventor(s) Moir et al.

U.S. Appl. No. 10/894,829, filed Jul. 20, 2004 and naming as inventor(s) Moir et al.

\* cited by examiner

HYBRID SOFTWARE/HARDWARE TRANSACTIONAL MEMORY

CROSS-REFERENCE TO RELATED APPLICATION(S)

This application is related to commonly-owned U.S. patent application Ser. No. 10/621,072, filed Jul. 16, 2003, entitled "Software Transactional Memory for Dynamically Sizable Shared Data Structures," and naming Mark S. Moir, Victor M. Luchangco and Maurice Herlihy as inventors, now U.S. Patent Application Publication US 2004/0015642.

BACKGROUND

1. Field of the Invention

The present invention relates generally to coordination amongst execution sequences in a multiprocessor, and more particularly, to techniques for coordinating access to a transactional memory space.

2. Description of the Related Art

In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads.

Such assurances have often been provided by using locks to prevent other threads from accessing the data affected by an ongoing operation. Unfortunately, the use of locks gives rise to a number of well known problems, both in terms of software engineering and in terms of performance. First, the right "balance" of locking must be achieved, so that correctness can be maintained, but the use of a particular lock does not prevent access to an unnecessary amount of unrelated data (thereby causing other threads to wait when they do not have to). Furthermore, if not used carefully, locks can result in deadlock, causing software to freeze up. While well documented, these and other problems are pervasive in concurrent programming, and addressing them often results in code that is complicated and expensive.

A further limitation exhibited by software that employs locks as a coordination mechanism is that, no matter how carefully used, lock implementations typically have the problem that if a thread is delayed (e.g., preempted) while holding a lock, then other threads must wait for at least the duration of that delay before being able to acquire that lock. In general, operating systems and other runtime environments cannot avoid this problem because they cannot accurately predict how long a particular lock will be held, and they cannot revoke the lock without jeopardizing correctness.

Transactional memory is a paradigm that allows the programmer to design code as if multiple memory locations can be accessed and/or modified in a single atomic step. As typically defined, a transactional memory interface allows a programmer to designate certain sequences of operations as "transactions," which are guaranteed by the transactional memory implementation to either take effect atomically and in their entirety (in which case we say they succeed), or have no externally visible effect (in which case we say that they fail). Thus, in many cases, it is possible to complete a multi-target operation with no possibility of another thread observing partial results, even without holding any locks. The transactional paradigm can significantly simplify the design of concurrent programs.

Transactional memory is widely recognized as a promising paradigm for allowing a programmer to make updates to multiple locations in a manner that is apparently atomic, while addressing many of the problems associated with the use of locks. In general, transactional memory can be implemented in hardware, with the hardware directly ensuring that a transaction is atomic, or in software that provides the "illusion" that the transaction is atomic, even though in fact it is executed in smaller atomic steps by the underlying hardware. See e.g., M. Herlihy and J. Moss, *Transactional Memory: Architectural Support for Lock-Free Data Structures*, In Proceedings of the 20th International Symposium in Computer Architecture, pp. 289-300 (1993); N. Shavit and D. Touitou, *Software Transactional Memory*, Distributed Computing, Special Issue (10):99-116 (1997). Unfortunately, neither hardware transactional memory nor software transactional memory techniques have been widely deployed in practice.

SUMMARY

There are a number of reasons for the less than enthusiastic adoption of transactional memory techniques. First, hardware transactional memory (HTM) designs typically impose limits on the number of locations that can be accessed or modified by a given transaction. Furthermore, simple HTM designs typically make no guarantees about forward progress. As a result, programmers can be hesitant to use HTM facilities, even if available. Software transactional memory implementations have had shortcomings of their own. For example, STM implementations have typically required static allocation and/or static transactions. In addition, most STM implementations have built upon non-transparent data representations and impose per-location space overhead. Finally, STM implementations have typically been computationally expensive and have typically suffered from the need for complex helping mechanisms.

For these and other reasons, what are needed are techniques that overcome the disadvantages of previous hardware transactional memory and software transactional memory techniques. A hybrid transactional memory technique has been developed, which aims to provide the best of both worlds (or perhaps more accurately, to avoid the worst of each). In particular, a powerful mechanism for hybrid transactional memory has been developed, which builds on the idea that transactions can be attempted one or more times using fast hardware support (if available and suitable), but can revert to more expensive but more flexible software support when desirable or necessary.

Accordingly, a transactional memory implementation in accordance with some embodiments of the present invention coordinates concurrent hardware transactional memory (HTM) and software transactional memory (STM) transactions over a unified transactional memory space. A software transactional memory implementation in accordance with some embodiments of the present invention employs hardware transactional memory, if available or suitable, to improve performance. Some embodiments in accordance with the present invention include a hardware transactional memory exploitation in which, or for which, hardware-mediated transactions are augmented to include within their transactional scope (or mechanism) one or more additional transactional locations that facilitate coordination with concurrently executing software-mediated transactions (if any).

The techniques described herein facilitate design and implementation of computational systems that combine the advantages of software transactional memory—such as a flexible interface and independence from hardware limitations—with the advantages of hardware transactional memory, e.g., good performance in the typical case. The described techniques also allow software based on transactional memory to be designed and tested before transactional memory is available in any particular target hardware, thereby facilitating the early exploitation of hardware transactional memory when it becomes available.

In some embodiments in accordance with the present invention, a hybrid transactional memory implementation coordinates concurrent hardware transactional memory (HTM) and software transactional memory (STM) transactions over a single transactional memory space. In some realizations, the hybrid transactional memory implementation preferentially executes a given transaction as an HTM transaction. In some realizations, at least some unsuccessful HTM transactions are retried as semantically-equivalent STM transactions.

In some embodiments in accordance with the present invention, a method of operating a computational system includes executing a first transaction against a transactional memory space, the first transaction executing under control of a software transactional memory (STM) facility, and executing, concurrently with the first transaction, a second transaction against the transactional memory space, the second transaction being presented to a hardware transactional memory (HTM) facility. The first and the second transactions cover at least one common transactable location. In some realizations, the method includes coordinating the first and concurrent second transactions using a transactable location ownership encoding maintained in correspondence with STM transactions against the transactional memory space. In some realizations the method includes detecting conflict, if any, between the first and second transactions by including in transaction scope of the second transaction those entries of the transactable location ownership encoding which map from the transactable locations targeted by the second transaction.

In some embodiments in accordance with the present invention, an apparatus includes one or more processors, a memory shared amongst the one or more processors to allow concurrent access by threads executable on respective ones of the processors, a hardware transactional memory (HTM) interface to a transaction space defined in the shared memory, a transactable location ownership data structure, and a coordination mechanism. The HTM interface is coupled between the processors and the shared memory. The transactable location ownership data structure is instantiable in the shared memory to track ownership status of transactable locations in correspondence with execution of software transactional memory (STM) transactions targeting transactable locations in the transaction space. The coordination mechanism causes the hardware transactional memory (HTM) interface to treat those entries, if any, of the transactable location ownership encoding corresponding to targets of a HTM transaction as within the apparent scope of the transaction. In some realizations, the coordination mechanism includes HTM transaction code augmented to read the corresponding entries. In some realizations, the apparatus includes a retry mechanism that eventually retries an unsuccessful HTM transaction as a semantically-equivalent STM transaction.

In some embodiments in accordance with the present invention, a method is employed to make a computer program product for execution in a computer system that supports coordinated hybrid HW/SW transactional memory. The method includes preparing an executable functional sequence corresponding to a source representation of code that includes a transaction construct, and including in the executable functional sequence alternative functional encodings corresponding to the transaction construct. A first alternative functional encoding includes a software transactional memory (STM) encoding that includes operations to maintain, for targets of the transaction construct, entries a transactable location ownership encoding in correspondence with execution thereof. The second alternative functional encoding causes a hardware transactional memory (HTM) implementation to treat those entries, if any, of the transactable location ownership encoding corresponding to targets of the transaction construct as within the apparent scope of the transaction construct.

In some embodiments in accordance with the present invention, a computer program product is encoded in one or more storage media. The computer program product includes a hardware transactional memory (HTM) sequence executable in a multithreaded computational environment that supports both HTM accesses and software transactional memory (STM) accesses to a single transactional memory space. The HTM sequence causes a corresponding HTM access to include in its apparent transactional scope at least a portion of a transactable location ownership encoding maintained in correspondence with concurrent STM accesses to the transactional memory space. In some realizations, the computer program product further includes an STM sequence corresponding to the HTM sequence and executable in the multithreaded computational environment.

In some embodiments in accordance with the present invention, a computer program product is encoded in one or more media and includes corresponding software transactional memory (STM) and hardware transactional memory (HTM) sequences, wherein either or both of the STM and HTM sequences are executable in a particular multithreaded computational environment and wherein each corresponds to a same transactional access to be performed. The HTM sequence causes a corresponding HTM transaction to include in its apparent transactional scope at least a portion of a transactable location ownership encoding maintained in correspondence with concurrent STM accesses, if any, to the transactional memory space.

In some embodiments in accordance with the present invention, n apparatus includes at least one processor including an interface to hardware transactional memory (HTM), code executable on the processor to provide a software transactional memory (STM) interface and means for coordinating operation of the hardware transactional memory and the software transactional memory for transactions targeting overlapping sets of transactable locations.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
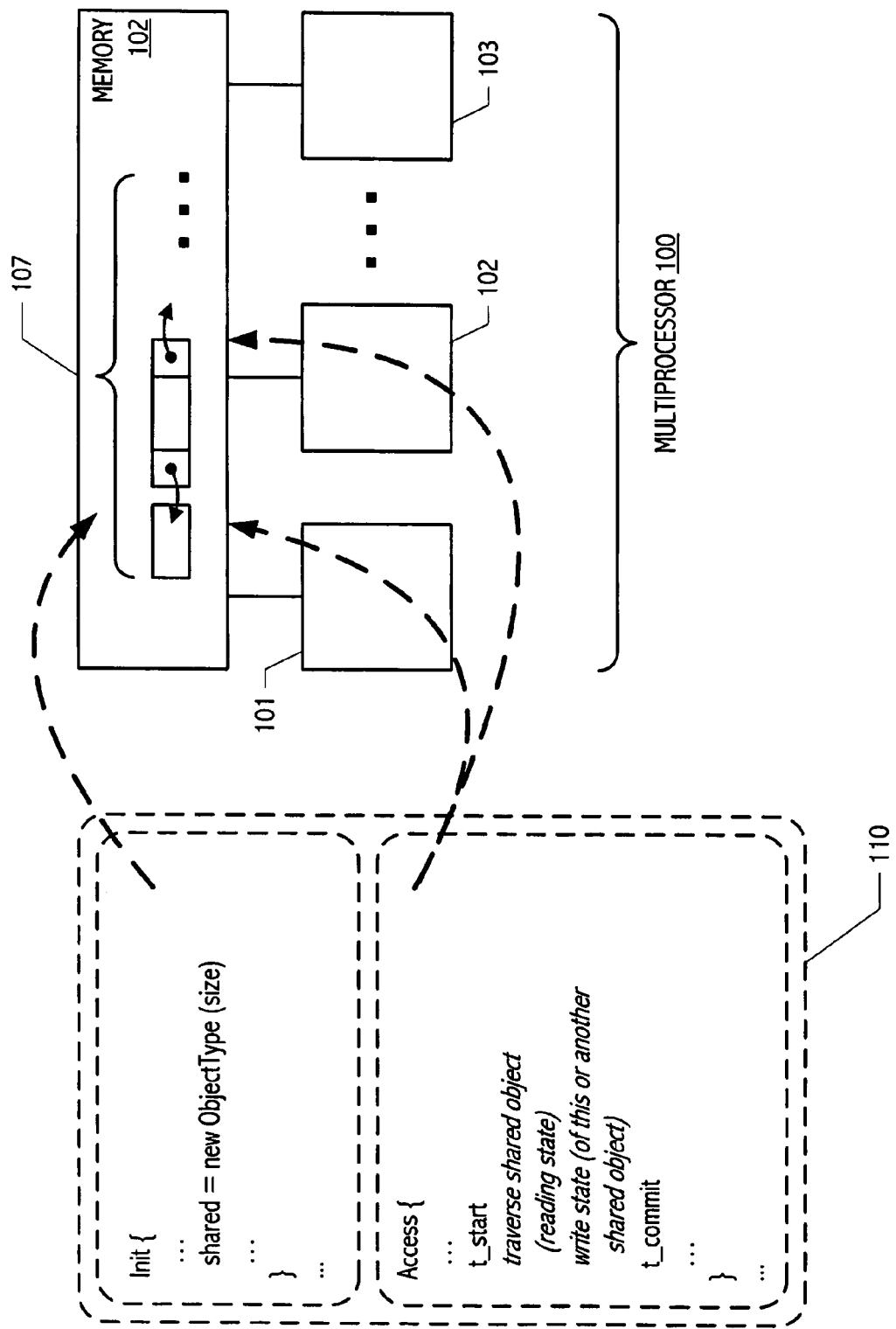
FIG. 1 depicts an exemplary multiprocessor on which techniques in accordance with present invention may be exploited.

A versatile mechanism has been developed for coordinating amongst threads of a multithreaded computation that employs a transactional memory facility. We describe herein a class of transparent, dynamic software transactional memory implementations that use hardware transactional memory to improve performance if it is available, but do not depend on it. We call our techniques hybrid transactional memory (HybridTM).

In describing HybridTM implementations, we begin by defining the logical value of each transactable memory location at each point in time in terms of some broad notions such as transactions, ownership of locations, etc. Given this definition, we then give more concrete details about possible ways to represent these notions, along with STM code that implements transactions over the transactable locations (in terms of their defined logical values). We design this code such that we can integrate the STM code with concurrent hardware transactions over the same logical values. This way, we can choose between executing a particular transaction using the STM code or hardware TM (if available). One technique that facilitates our integration of hardware and software transactions is to design the software transactional memory part of the HybridTM such that hardware transactions can detect conflicts with concurrent software transactions and abort. Such transactions can subsequently be retried as hardware transactions or software transactions. We describe a number of ways in which such detection can be achieved.

In particular, we describe techniques that augment transactions to be executed in hardware so that they read from additional locations in order to detect conflicts with concurrent software transactions, and abort if such conflicts are detected. We describe alternatives for ensuring forward progress despite repeated conflicts between hardware and software transactions. In general, those transactions that fail to commit as hardware transactions are eventually retried in software that is integrated with contention management mechanisms that are designed to ensure progress.

In general, a transactional memory may be presented to a programmer simply as a memory subsystem (e.g., using hardware and/or other facilities not entirely visible to application code executing on a processor), using software constructs that define an interface the transactionally-managed memory (e.g., via a defined calling interface for transactional access), or as a hybrid interface that supports both hardware-mediated and software-mediated access to a transactional memory space. Accordingly, our techniques may implemented using mechanisms introduced into a variety of components of a computational system. Indeed, our techniques are amenable to a variety of exploitations including:

(a) as a software transactional memory interface that leverages and coordinates with an underlying hardware transactional memory facility, in part, by augmenting transactions destined for evaluation by the hardware transactional memory with additional transactional locations for coordination with concurrently executing software-mediated transactions, if any;

(b) as a hardware-mediated transactional memory implementation (e.g. a memory subsystem) that automatically includes additional transactional locations within the transactional scope of implemented transactions for coordination with concurrently executing software-mediated transactions, if any; and/or (c) as a code preparation environment, compiler, execution environment (or computer program product resulting from operation of any of the foregoing) that augments transaction sequences to include accesses to additional memory locations (beyond those required for the programmer-defined transaction semantics) in order to detect conflicts, if any, with a concurrently executing software-mediated transactions.

Software-mediated transactions manipulate state of the additional transactional locations to facilitate coordination with their hardware-mediated brethren.

Many suitable implementation alternatives exist. In general, suitable implementations build on some broad design principles and leave open a variety of implementation options consistent with these principles. Indeed, particular interfaces for the implemented HybridTM and particulars of an assumed hardware transactional memory facility (if any) are not crucial to exploiting our approach. For concreteness and clarity of description, we describe an exemplary interface for each. However, based on the description herein it is straightforward for those skilled in the art to apply our techniques to achieve similar results using different interfaces or facilities.

Therefore, in view of the above, and without limitation, certain illustrative exploitations of the inventive techniques are described with particular attention to illustrative transactional memory interfaces and hardware transactional memory facilities. Such illustrative interfaces and exploitations should be viewed only as useful descriptive context, as the invention is defined solely by the claims that follow.

Transactional Memory, Generally

A multiprocessor is a computer in which multiple processors are configured to execute cooperative computations, typically communicating through a shared memory. A thread is an execution sequence (e.g., a program or distinct thread or strand of execution thereof) that executes for a relevant period on a single one of the processors. FIG. 1 depicts an exemplary multiprocessor 100 including multiple processors 101, 102 . . . 109, and a memory 102 of which at least a portion is shared or sharable by two or more of the processors. A given program (e.g., threads of execution corresponding to illustrated pseudocode 110) may execute on multiprocessor 100 as plural cooperating threads. Similarly a thread of execution corresponding to a first program may cooperate with a thread of execution corresponding to a second program. Threads typically manipulate data structures (e.g., data structure 107) that reside in memory (e.g., in one or more physical stores corresponding to memory 102). For simplicity of illustration, hierarchies of storage (e.g., levels of cache and memory) typical of modern processor architecture are not specifically illustrated. A thread modifies or observes a shared data structure by executing a sequence of instructions. Often, there is a need to execute such a sequence atomically (or at least apparently so), so that the instructions are not interleaved with instructions of any other thread that is modifying or observing the same data structure.

One technique known in the art for implementing atomicity is for the programmer to associate a lock with the shared data structure. A lock is typically a memory location that can be atomically modified or examined by a thread. Before a thread can access an object, it must acquire a lock by atomically changing the lock from a free state to a busy state. A thread releases a lock by atomically changing the lock from busy back to free. Nevertheless, it is known that locks have certain disadvantages, including poor performance when the number of concurrent threads is high, and the difficulty of designing and maintaining software that uses large numbers of locks.

Accordingly, our techniques aim to provide support for light-weight transactions. A transaction is a finite sequence of machine instructions, executed by a single thread, satisfying the following properties:

Linearizability: Transactions appear to execute serially, meaning that the steps of one transaction never appear to be interleaved with the steps of another. If transaction A finishes before transaction B starts, then transaction A appears to have executed before B.

Atomicity: Each transaction makes a sequence of tentative changes to shared memory. When the transaction completes, it either commits, making its changes visible to other threads (effectively) instantaneously, or it aborts, causing its changes to be discarded.

For clarity of description, we assume here that a thread executes only one transaction at a time, although the model can be extended to permit overlapping or logically nested transactions. Based on the description herein, persons of ordinary skill in the art will recognize suitable extensions.

Design Principles

We believe that the shortcomings listed above for previous software transactional memory (STM) implementations are due in large part to the fact that their designers have started their design process by making assumptions about models of computation (for example assumptions about asynchrony and fault models), hardware support for synchronization (for example compare-and-swap (CAS) or load-linked/store-conditional (LL/SC)), operating system support (it is typically assumed that no special support is available), and non-blocking progress requirements (for example, lock-freedom or wait-freedom).

In this work, we have instead taken the approach of setting ground rules that are important for transparency and usability, and then taking a pragmatic approach to achieving useful implementations that obey these rules. The result is a general framework that shows at a high level how to implement transparent and usable software transactional memory that can use various forms of hardware support to improve performance, but can also provide correct transactional memory support even in systems that do not provide special hardware support for this purpose.

Within the general framework, various approaches can be used for implementing various components of the hybrid transactional memory. In some cases, different assumptions about hardware and operating system support can result in different properties of the overall implementation with respect to performance, scalability, and progress properties. However, these differences need not affect the interface of the HybridTM with software. Therefore, if we implement a HybridTM package within the general framework, we can then design and implement software that uses it. Future improvements to the HybridTM implementation (including the addition or improvement of hardware support for transactional memory) will then immediately translate into improved performance for such software, with no need to revisit the software that uses it. Similarly, it also allows us to immediately exploit future improvements in hardware transactional memory implementations. We believe that this approach will significantly aid the early exploitation of hardware transactional memory support when it becomes available, because programmers can use software-only implementations of a HybridTM interface to develop and test software that uses transactional memory before it is available in hardware.

HybridTM Properties

While each and every exploitation of the developed techniques need not capitalize on every potential advantage of our techniques, it is notable that certain HybridTM implementations described herein advantageously support:

Dynamic Allocation: memory locations to be accessed by transactions can be allocated and initialized "on the fly", and there is no need to declare in advance how much or which memory will be accessed by transactions.

Dynamic Transactions: transactions can use the contents of locations already accessed in the transaction to determine which locations are subsequently accessed by the transaction.

Transparency: there are no restrictions on the values that can be stored in locations accessed by transactions, and the use of transactional memory does not impact the layout of data. However, there is a slight lack of transparency in that a memory location that can be accessed by transactions (call them transactable or transactional memory locations) should not be accessed using ordinary memory instructions such as loads and stores outside a transaction unless it is known that no concurrent transactions can access that location.

Zero per-location overhead: the space overhead of the implementation is independent of the number of memory locations that can be accessed by transactions.

In contrast, we note that conventional STM approaches have generally been characterized by static allocation of transactional storage and static transactions. In addition, conventional STM approaches typically lack data storage transparency. For example, many STM implementations require data values to be stored together with additional control bits in atomically-accessible memory locations. As a result, such implementations restrict the set of values that can be stored by transactions and also affect data layout. Thus, while attempting to help programmers by providing atomic access to multiple locations, these implementations introduce new headaches, and therefore—from a software engineering point of view—do not provide a clear win over using locks. Finally, conventional STM implementations have typically required additional memory to be allocated per memory location that can be accessed by the transactional memory, resulting in a significant space cost.

As described herein, the developed HybridTM techniques represent a new approach to implementing transactional memory that aims to overcome many disadvantages of previous hardware and software transactional memory designs. Of course, the importance of any individual feature or behavior is, in general, exploitation-dependent and any given implementation need not exhibit all of the foregoing advantages.

Sample Interface for Word-Based STM

In this section, we describe an interface for word-based software transactional memory (STM). While the described interface and supporting implementations are useful in their own right, they also provide a framework for coordinating concurrently executing software-mediated transactions and hardware-mediated transactions over a memory space. We first describe the word-based software transactional memory (STM) without regard to coordination with hardware-mediated transactions. Later, we illustrate coordination (i.e., HybridTM implementations) using structures and techniques of the software transactional memory (STM) implementation.

In view of the above, we now describe an exemplary software transactional memory (STM) interface. This interface is useful for a concrete description of our techniques, but it will be appreciated by those skilled in the art that a variety of interfaces are possible consistent with the core ideas presented here. For example, and without limitation, persons of ordinary skill in the art will appreciate a variety of linguistic constructs for expressing the desire for a section of code to be executed atomically as a transaction, with a compiler translating user source code so that it conforms to an interface similar to the one presented below. In-lined code, optionally executable sequences and/or other techniques may be employed in furtherance of the techniques described elsewhere herein.

Each transaction is defined within a single thread of control, and includes a tr_begin( ) operation followed by zero or more transaction operations, followed by either a tr_commit( ) operation or a tr_abort( ) operation. Each transaction operation is either a tr_store (a, v) operation for some memory address a and some value v; a tr_load(a) operation for some memory address a; or a tr_validate( ) operation. Each tr_commit( ) operation returns a boolean value indicating success (true) or failure (false). Each tr_load(a) operation returns a value. Each tr_validate( ) operation returns a boolean value that is true only if the current transaction can still commit successfully in the future. We say that a thread has an outstanding transaction if the thread has begun a transaction but has not yet completed it (by invoking either tr_commit( ) or tr_abort( )).

Simplifying Assumptions

For purposes of this description, we presume that no thread begins a new transaction while it has an outstanding transaction. We later discuss how the techniques can be adapted to accommodate nested transactions.

For the purposes of this description, we assume that memory locations that are accessed by transactions are not also accessed by regular load and store instructions by threads. It will be appreciated by those skilled in the art that, in fact, non-transactional accesses to locations that are not subject to concurrent transactions can be supported. Such support is useful, for example, for initialization of locations on which transactions will be executed later. It will also be appreciated that some non-transactional accesses to transactional memory locations are possible even if there are concurrent transactions executing that may access those locations. For example, it may be desirable to support an inexpensive non-transactional load operation for which it is not crucial that the current logical value is returned. However, our presentation is simplified by excluding these possibilities.

Transaction Semantics

We say that a transaction t reads (value w from) a location a if t contains a tr_load(a) operation (returning w) that is not preceded by a tr_store(a, v) operation in t for any v. We say that a transaction t writes (value w to) a location a if t contains a tr_store(a, w) operation that is not followed by any tr_store (a, v) operation in t for any v≠w.

The semantics of transactions is specified by the following requirements:

In every state of every execution, a logical value is associated with each transactable location; these values are taken from the range of values that can be stored in transactable locations.

Every complete transaction that ends with a tr_commit( ) operation that returns true has a unique associated point between the invocation of its tr_begin( ) operation and the completion of its tr_commit( ) operation, and this point satisfies the requirements stated below. We call this point the transaction's linearization point.

If a transaction t reads w from location a, and t subsequently executes a successful tr_commit( ) operation, then the logical value of location a is w immediately before t's linearization point.

Every tr_load(a) operation in transaction t that is preceded by a tr_store(a, v) operation in t for some v returns the value v of the most recent such tr_store(a, v) operation in t.

For each successful tr_validate( ) operation in transaction t, if we replace that operation with a successful tr_commit( ) operation, and remove all subsequent operations in t, then t still respects the transactional semantics.

The logical value of memory location a changes only at the linearization point of a transaction that ends with a successful execution of tr_commit( ) operation and that writes location a; in this case, the new logical value of location a becomes the value v that t writes to a.

To keep our presentation simple, we state the required semantics without considering the possibility that transactable locations can be allocated and deallocated dynamically. However, it will be appreciated by those skilled in the art that we can consider a newly-allocated location to "come into existence" at the moment it is initialized with its initial logical value, and that it can "cease to exist" when it is deallocated. Of course, user code should ensure that it does not access nonexistent transactable locations.

The preceding semantics implies that if a transaction commits successfully, then the effect—at least with respect to transactional memory locations—is the same as if the transaction had been executed without interleaving the steps of any other transactions. However, it says nothing about the circumstances under which a transaction is required to commit successfully. In particular, as specified thus far, implementations in which tr_commit( ) always returns false are acceptable. Clearly such an implementation is not particularly useful. However, because different implementations may make different guarantees with respect to successful commits, we view the circumstances under which such guarantees are made as a property of an implementation, rather than as a basic requirement.

The preceding semantics also dictates nothing about the values returned by tr_load(a) operations in a transaction that does not commit successfully. While such transactions do not modify the logical value of any location, they may adversely affect a computation if they view inconsistent values. For example, a transaction might perform some illegal action, such as dereferencing a null pointer, dividing by zero, or violating array bounds if it sees inconsistent values. To avoid this, a transactional memory implementation should either provide functionality for a thread to check whether its current transaction can still commit successfully (generally known as a "validate" operation), or it should ensure that a transaction does not continue to execute after it can no longer commit successfully, for example by automatically branching to a "failure location" when the transaction is no longer viable. It is generally straightforward to provide a validate operation, and depending on the language and compiler used to implement the transactional system, the validate operation can be used to control flow so that a transaction that cannot commit successfully in the future does not continue to execute (note that it is sufficient to perform the validation check after every tr_load(a) operation because only returning an inconsistent value from a tr_load(a) operation can cause a correct transaction to misbehave). Therefore, to avoid unnecessarily constraining the set of environments in which our invention is applicable we simply require a tr_validate( ) operation that returns true only if the current transaction can still commit successfully.

It is important to note that the above-defined transactional semantics does not say anything about non-transactional code that is executed within a transaction. For example, if a thread performs a non-transactional store to some memory location within a transaction, then that store takes effect at that time, regardless of whether the enclosing transaction subsequently commits successfully. While it may seem undesirable to allow such behavior, it can be useful, for example for keeping statistical information about transactions, or for modifying variables that are known not to be shared. An example of the latter case is that a compiler might reduce the overhead and size of a transaction by using simple loads and stores for stack updates and updates of private variables that are spilled from registers; because such variables are not shared, changes to them can be "rolled back" non-atomically upon transaction failure, for example.

Implementation Framework to Support Hybrid Transactional Memory

As previously stated, we describe a software transactional memory (STM) implementation that, while useful its own right, also provides a framework for coordinating concurrently executing software-mediated transactions and hardware-mediated transactions over a memory space. As before, we first describe the implementation framework without regard to coordination with hardware-mediated transactions. Later, we illustrate coordination (i.e., HybridTM implementations) using structures and techniques of the software transactional memory (STM) implementation.

Some STM and HybridTM implementations consistent with the framework described herein build upon the notions of status and writeset for each transaction, and of ownership for each memory location targetable by transactions. (Later, we describe a variation that employs an undo set.) These notions may be implemented in a variety of ways, and we present concrete methods later in order to illustrate some embodiments of the present invention. Logically, the status of each transaction is either active, aborted, or committed, and each memory location is either owned by a single transaction t or unowned. Given these notions, we can define the logical value of a memory location as follows:

Logical Value: The logical value of a memory location with address a is defined to be the current value stored at a unless a is currently owned by a committed transaction t such that t's writeset contains a pair (a, v), in which case the logical value of location a is v. The logical value is well defined in this case because we will ensure that there is at most one pair (a, *) for any a in a transaction's write set at any point in time. Definition of logical value of a transactable memory location is useful for describing a class of implementations of transactional memory over these locations. Below we explain at a high level how atomic transactions over such locations can be effected.

First, observe that committing a transaction t—that is, changing its status from ACTIVE to COMMITTED—Changes the logical value of each location $a_i$ such that t owns $a_i$ and t's writeset contains $(a_i, v_i)$ to $v_i$. Thus, by committing a transaction, we can atomically effect changes to the logical values of multiple transactable locations. Specifically, a transaction t arranges that, immediately before t commits, t owns all of the locations that it accesses, and contains an appropriate pair in its writeset for each location that it writes.

Figure 2:
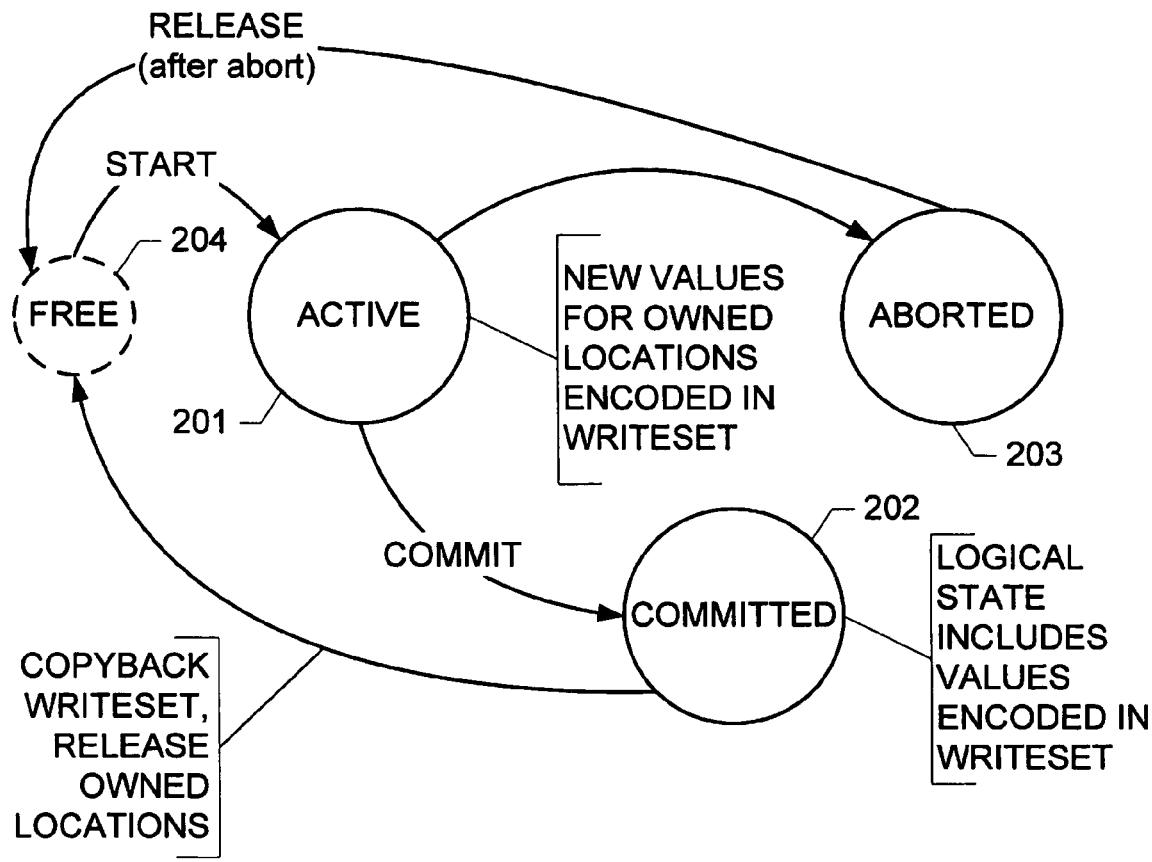
FIG. 2 illustrates status transitions for a software-mediated transaction executing in a software transactional memory (STM) implementation suitable for use in some HybridTM embodiments in accordance with the present invention.

FIG. 2 illustrates status transitions for a software-mediated transaction executing in a software transactional memory (STM) implementation such as that described herein. In some embodiments in accordance with the present invention, the transactional memory implementation is a HybridTM implementation in which coordination between hardware-mediated transactions and software-mediated transactions is provided as described later herein. In either case, operation of the described implementations will be understood with reference to FIG. 2. In particular, a transaction, begins (e.g., in response to a transaction start directive) in status ACTIVE (201). An active transaction acquires ownership of each transactable location that it reads (or writes) and encodes each updated value in a writeset. At some point, an active transaction that has not been aborted attempts to commit. Upon transition to status COMMITTED (202) the logical state of transactable locations owned by the committed transaction includes values encoded in the committed transaction's writeset. Eventually, a logical state encoded in the committed transaction's writeset is copied (or written) back to appropriate storage corresponding to the transactable locations (typically the transactable locations themselves).

In general, an active transaction may transition to status ABORTED (203), e.g., if aborted by another transaction that seeks to take ownership of a transactable location owned by the previously active transaction. Finally, in some implementations a FREE status (204) may be employed to encode that a given transactional record is not in use by any thread.

Note that, as described thus far, a transaction acquires ownership of all locations that it accesses: it acquires ownership of a location a that it reads before reading a value from that location. This ensures that, immediately before the transaction successfully commits, each location a that it read but did not write has the same logical value as the value read from a by the transaction (because another transaction can change the logical value of location a only by acquiring ownership of it). While this is easy to understand and to implement, this approach has the drawback that it does not support read-sharing: that is, it does not allow multiple concurrent transactions to read memory locations in common and all commit successfully. We later explain how our implementations can be extended to overcome this drawback.

Because a transaction's status encodes one of three values: active, aborted, or committed, it is straightforward to commit an active transaction using a simple synchronization primitive such as provided by a Compare-and-Swap (CAS) operation, a Load-Linked/Store-Conditional (LL/SC) operation pair, or the like. We use such a primitive because our implementations depend on the ability of one transaction to abort another—that is, change its status from active to aborted, and in this case, the aborted transaction should not subsequently commit successfully. Therefore, the interesting part of designing an STM based on this approach is how transactions can acquire ownership of locations without changing the logical value of any location, and how they can be sure that they do not lose ownerships so acquired before successfully committing.

At a high level, this is achieved as follows. When a transaction wants to acquire ownership of a location that is currently unowned, it simply uses CAS to atomically acquire ownership of the location (we discuss concrete representations of ownership later); transactions do not acquire ownership of locations after committing, so acquiring ownership of an unowned location does not change the logical value of any location.

From the definition of the logical value of a transactable location given above, we can see that if a transaction t acquires ownership of a location that is already owned by another transaction $t_0$ while $t_0$ is committed, then there is a risk that this action changes the logical value of location a (if $t_0$ contains a pair (a, v) in its writeset, and location a contains a value $v_0 \neq v$). This possibility must be avoided, because a transaction that is simply attempting to acquire a location in preparation for committing later should not change the logical value of any location. Therefore, transaction t cannot generally acquire ownership of location a from $t_0$ while $t_0$ is committed. Furthermore, t cannot attempt to acquire ownership of a from $t_0$ while $t_0$ is active, because t's attempt might be delayed, and $t_0$ might become committed in the meantime. If t requires ownership of a, and $t_0$ currently owns a and $t_0$ is active, then t can attempt to abort $t_0$, and if this attempt is successful, then it is safe for t to acquire ownership of a from $t_0$. On the other hand, if $t_0$ is committed, it is not safe for t to simply acquire ownership, as explained above. This is the most difficult case to deal with in TM implementations based on the framework described above. In this case, t has the following options for acquiring ownership of a without changing its logical value:

1. wait for to release ownership of a
2. acquire ownership of a from $t_0$ while ensuring that either:
   a) there is no pair (a, v) for any v in $t_0$'s writeset, or
   b) there is a pair (a, v) in $t_0$'s writeset and location a contains v at the moment t acquires ownership While option 1 above is conceptually simple, it has significant drawbacks, especially if the thread executing transaction $t_0$ has been preempted. Option 2 is challenging in the case in which there is a pair (a, v) in $t_0$'s writeset because it may require t to change location a to contain value v. Observe that t may be delayed in attempting to change location a, and that in the meantime, to might release ownership of a, and other threads may acquire ownership and change a. Thus, t might belatedly change the contents of location a to v, which by then is an "old" value, resulting in an incorrect change to the logical value of location a. Because of the transparency requirement that there can be no restriction imposed by the TM implementations on values stored in transactable locations, traditional means for avoiding such "late" updates, including techniques such as version numbers and bounded tags, are not applicable. In our presentation below, we first illustrate a simple implementation in which t waits for to to release ownership (option 1); we later discuss several possibilities for building on this simple implementation to achieve option 2.

Figure 3:
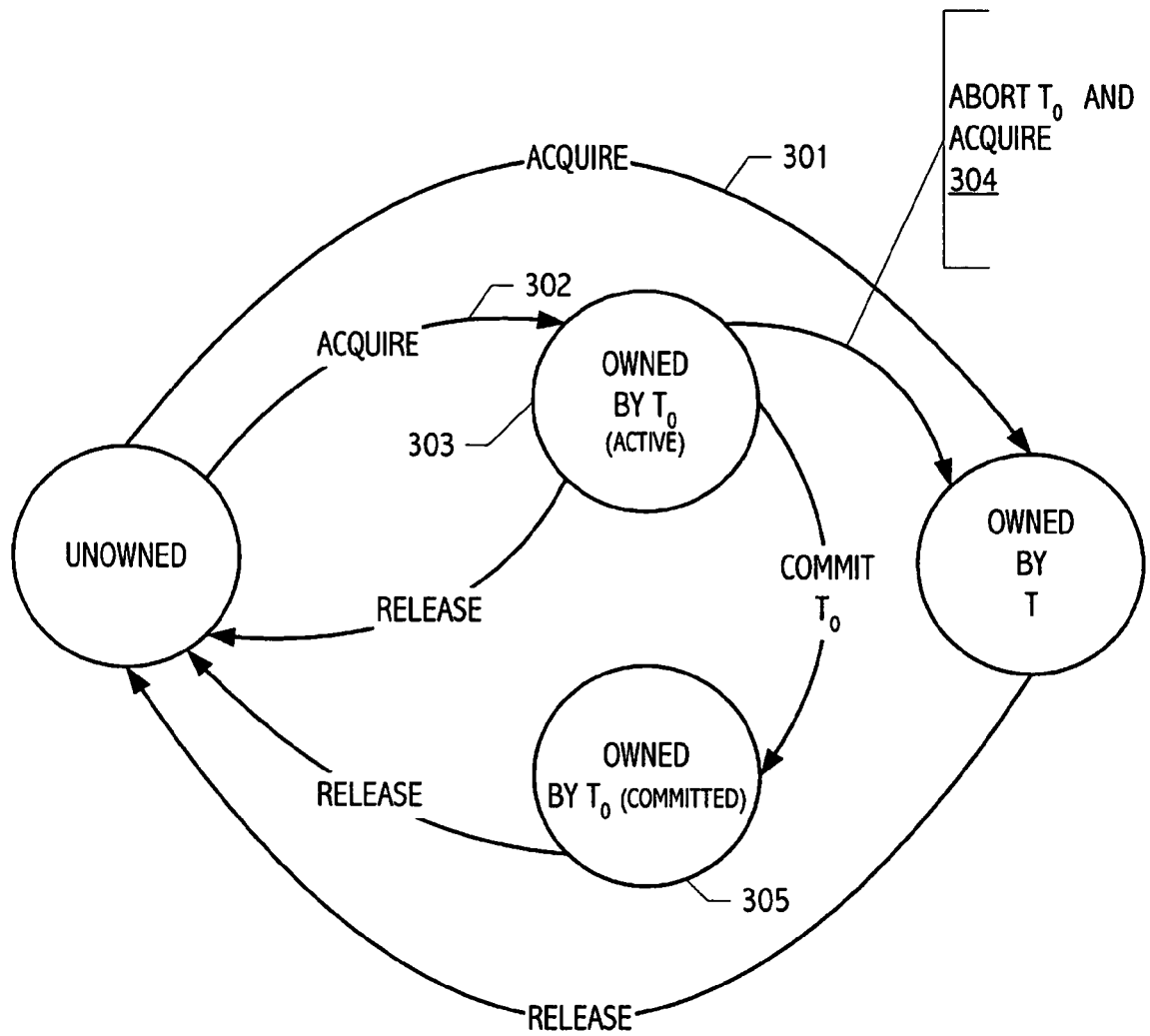
FIG. 3 illustrates status transitions for a software-mediated transaction executing in a software transactional memory implementation suitable for use in some hybrid transactional memory embodiments in accordance with the present invention.
Figure 4:
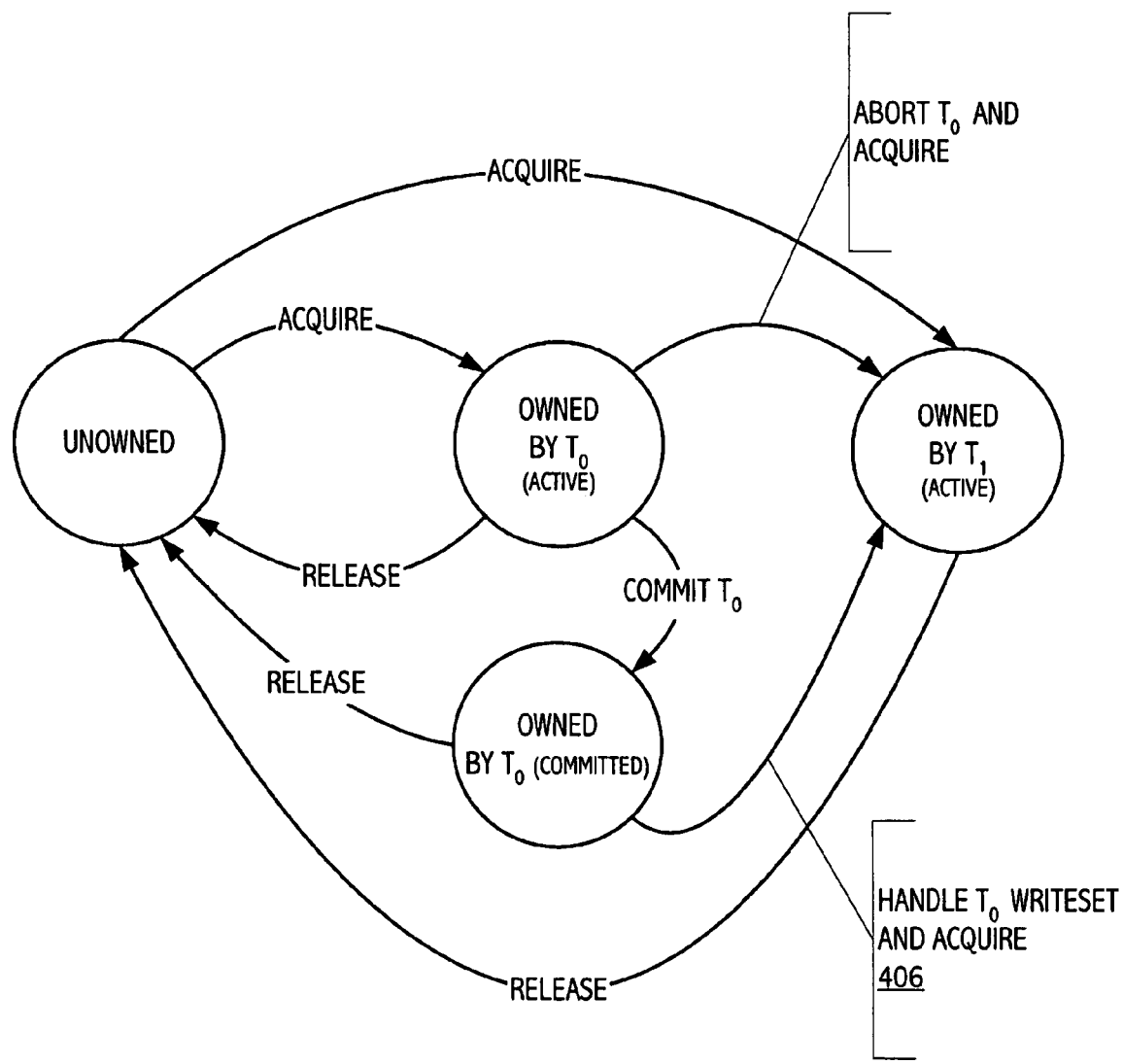
FIG. 4 illustrates status transitions for a software-mediated transaction executing in a software transactional memory implementation suitable for use in some hybrid transactional memory embodiments in accordance with the present invention in which an acquiring transaction may propagate logical state encoded in a committed transaction's writeset.

FIG. 3 illustrates a simple set of status transitions for ownership of a transactable location by a software-mediated transaction executing in a software transactional memory (STM) implementation such as that described herein. The simple illustration of FIG. 3 presumes that a transaction t that seeks to acquire ownership of a transactable location a without changing its logical value simply waits for release by a committed transaction that owns the transactable location. The illustration of FIG. 4, depicts a flow in which the acquiring transaction may propagate logical state encoded in a committed transaction's writeset.

Turning first to FIG. 3, ownership of a transactable location a that is currently unowned (mode=UNOWNED) is simply (e.g., 301, 302) acquired by the transaction (e.g., $t_0$ or t) that seeks to do so. Coordination amongst competing acquirers may be handled using a synchronization construct such as a CAS operation, LL/SC operation pair, or the like. If transactable location a is owned (e.g., in a READ, WRITE or other appropriate mode) by a transaction (e.g., transaction $t_0$) that has not committed (see state 303), another transaction (e.g., transaction t) may abort the owning but uncommitted transaction $t_0$ and acquire (304) transactable location a. However, in implementations in accordance with FIG. 3, transaction t must wait for a committed transaction $t_0$ (see state 305) to release transactable location a before acquiring same. FIG. 4 illustrates a variation (corresponding to option 2, above) in which the acquiring transaction t may propagate (406) logical state encoded in the writeset of committed transaction $t_0$. An exemplary implementation is described in greater detail below.

Word-Based STM Implementation

We now describe a simple word-based, software transactional memory (STM) implementation in accordance with the preceding framework. The STM implementation supports coordination of concurrently executing software-mediated transactions and hardware-mediated transactions over a memory space. As before, we first describe the implementation framework without regard to coordination with hardware-mediated transactions. Later, we illustrate coordination (i.e., HybridTM implementations) using structures and techniques of the STM implementation. Many variations are possible consistent with the present invention, and some of these are discussed later. Our presentation assumes a sequentially consistent memory model, but it can be made applicable for a variety of weaker memory consistency models by the insertion of appropriate memory barrier instructions.

Since one goal for the basic STM implementation is that it be usable even in the absence of hardware transactional memory (HTM), the implementation relies only conventional synchronization support. Widely available hardware synchronization primitives include CAS and the load-linked/store-conditional (LL/SC) instruction pair. Here, we outline an implementation based on CAS. It is straightforward for one skilled in the art to adapt such an implementation that instead uses LL and SC. To avoid restricting applicability of our implementation, we insist that it does not perform CAS operations on values that are larger than pointers. For concreteness, we present our implementation assuming a 64-bit address space and a CAS operation that can operate on 64-bit values, but not larger ones. Of course, other implementations may employ unconventional (or less conventional) synchronization support or may rely upon HTM facilities, if desired.

Before we begin describing the implementation in detail, we first describe the basic data structures used to represent the notions described in the high-level description above: transactions and their statuses and writesets, as well as ownership of transactable memory locations. We also introduce other structures not central to the high-level description. For example, we introduce readsets, which are used to track those locations acquired for read only, so that we may release these ownerships after a transaction completes.

Representing Transactions

In some STM implementations in accordance with the present invention, transactions are represented by a transaction record of type trans_entry_t. One suitable structure for these records is outlined below. Note that the header field, which consists of status and version fields, can be accessed atomically by a synchronization operation such as a 64-bit CAS operation.

```
struct trans_header_s {
    unsigned int status:2;   // 0=FREE, 1=ACTIVE,
                             // 2=ABORTED, 3=COMMITTED
    unsigned int version:62;
} trans_header_t;
// trval_t is a generic type used to represent
// values storable in one transactable location
struct tr_locval_s {
    tr_val *loc;
    tr_val val;
} tr_locval_t;
typedef write_set_t set of tr_locval_t;
typedef read_set_t set of tr_val*;
struct trans_entry_s {
    trans_header_t header;
    write_set_t ws;
    read_set_t rs;
} trans_entry_t;
// initial TRAN table conditions: headers zero;
// read and write sets empty
trans_entry_t TRAN[TR_TABLE_SIZE];
typedef tr_id_t int;
```

We assume for convenience that an array TRAN of transaction records is preallocated to be large enough to accommodate the maximum number of concurrent transactions. Alternatively, using techniques described in commonly-owned, co-pending U.S. patent application Ser. No. 10/866,570, filed 11 Jun. 2004, entitled "NON-BLOCKING GROWABLE ARRAYS" and naming Mark S. Moir and Simon Doherty as inventors, it is possible to implement an array that grows to the required size without the need to preallocate space for the maximum possible number of transactions in advance.

A transaction identifier is an index into the TRAN array. Each transaction record contains a header field, which in the illustrated coding consists of a status field and a version number. The status field contains FREE if no transaction is currently using that transaction record, and otherwise contains ACTIVE, ABORTED, or COMMITTED to indicate the status of the transaction that is using the record. Entries in this array (and therefore transaction identifiers) can be reused.

The writeset ws is a set of (address, value) pairs that contains at most one pair (a, *) for any a. The writeset can be implemented in a variety of ways, and it is relatively easy to implement because it is only modified by a single thread (the one that initiates the transaction that contains it), and the requirements for concurrent readers are quite weak. In particular, we require that readers can accurately query the set and iterate over its members only if such access is not concurrent with access by a modifying transaction. In the case of concurrent accesses between a modifying transaction and some thread performing membership queries or iterating over the elements of the set, the requirements are strong enough to prevent bad behavior such as infinite loops, etc., but are otherwise very weak. Based on the description herein, persons of ordinary skill in the art will appreciate a variety of suitable implementations for the writeset. For example, a closely related structure with similar requirements is presented in M. Moir, *Laziness Pays! Using Lazy Synchronization Mechanisms to Improve Non-Blocking Constructions*, In *Proceedings of the 19th Annual ACM Symposium on the Principles of Distributed Computing*, pages 61-70 (2000). In general, any suitable structure may be employed.

The readset (rs field) is a set of memory locations; it is used to record which locations are read and not written by the transaction. This set is used only by the thread that initiates the transaction, so it is a purely sequential data structure, and can therefore be straightforwardly implemented by any of a variety of well known methods.

Representing Ownership

Our transparency goals prevent us from using state directly associated with a particular location to encode ownership of that location. Specifically, for value transparency, we avoid embedding control bits within data values, and for data layout transparency and space overhead requirements, we avoid using control data that is allocated or declared together with the transactable data locations. Therefore, we represent ownership with a separate table; call it OWNER. As will be seen, the particular table size chosen does not affect correctness, but sizing the table too small may result in significant performance degradation. One suitable structure is outlined below.

```
struct owner_entry_s {
    unsigned int id:32;   // Owning transaction, if any
    unsigned int version:30;
    unsigned int mode:2;  // 0=UNOWNED, 1=READ, 2=WRITE
} owner_entry_t;
owner_entry_t OWNER[OWNER_TABLE_SIZE]; // initially, all zero
```

Each transactable memory location is associated with a particular entry of the ownership table via some hash function; one simple and efficient way to achieve this association is to use choose the table size to be $2^i$ for some integer $i \geq 0$, and to then use a sequence of i bits from the address of the given location. A natural choice is to ignore low-order bits that are the same for every address due to alignment, and then take the next i least significant bits. In some cases, it may be desirable to use a more sophisticated hash function in order to avoid conflicts. In general, suitability of a hash function is a matter of design choice. We will refer to the hash function used as h.

OWNER [h(a)] is an entry that indicates which transaction, if any, currently owns the memory location whose address is a (and in fact all addresses a' such that h(a')=h(a)). Specifically, the entry contains—in a single CAS-able word—a record of the owner_entry_t structure detailed above. This structure contains the transaction id of the transaction that currently owns the location (if any), a version number, and a mode field indicating whether locations that map to this location are UNOWNED, or owned for READ or WRITE. As explained in more detail later, this distinction enables transactions executed using hardware transactions to read share locations with concurrent software transactions. However, because each location can be owned by at most one software transaction at any time, this basic implementation does not allow for two concurrent successful transactions to read a location in common (or indeed to read locations that map to the same record in the OWNER table). Later, we discuss some alternatives for relaxing this constraint.

The version field of each entry of the OWNER table contains a version number, which is needed to avoid the well-known ABA problem. To simplify our presentation, we assume that the version number never wraps around. Provided enough bits are used, wraparound is not a problem in practice. Alternatively, other suitable techniques may be employed. See generally, M. Moir, *Practical Implementations of Non-Blocking Synchronization Primitives*, In *Pro-*

*ceedings of the 16th Annual ACM Symposium on Principles of Distributed Computing*, pages 219-228 (1997) for a discussion of this point.

Implementing Transactions

We now discuss transaction implementations. C-like pseudocode follows for our simple word-based STM implementation. Given the high-level functional descriptions and data structure descriptions above, the implementation should be reasonably self-explanatory; for clarity, we briefly explain the code below. Operations beginning with tr are interface operations to the STM; all others are auxiliary operations used by the STM implementation itself. Of course, all pseudocode is illustrative and, based on the description herein, persons of ordinary skill in the art will appreciate a variety of suitable alternatives and variations.

tr_begin( ) The tr_begin operation illustrated below simply uses CAS (or other suitable synchronization construct) to atomically change some currently free transaction record to an active transaction, and then initializes that transaction's read and write sets to be empty.

```
tr_id_t tr_begin( ) {
    trans_header_t old_th, new_th;
    tr_id_t id;
    while (true) {
        select id : 0 <= id < TR_TABLE_SIZE;
        old_th = TRAN[id].header;
        if (old_th.status == FREE) {
            new_th = old_th;
            new_th.status = ACTIVE;
            if (CAS(&TRAN[id].header,old_th,new_th)) {
                writeset_init(&TRAN[id].ws);
                readset_init(&TRAN[id].rs);
                return id;
            }
        }
    }
}
```

In this simple implementation, we need not worry about concurrent access to the transaction's read and writesets while they are being initialized because these sets are used only by that transaction. In the more sophisticated implementations described later, the writeset can be accessed concurrently by other transactions, and more care is required. However, as discussed earlier, even in that case, the correctness requirements for such concurrent accesses are relatively weak and easy to achieve.

Note that while CAS operations are generally employed in the illustrated code, persons of ordinary skill in the art will appreciate a variety of alternative synchronization constructs, including load-linked/store-conditional operation pairs, atomic read-modify-write operations and the like. In general, selection of an appropriate synchronization construct is design and implementation dependent. Use of CAS operations is for purposes of illustration and should not be taken as limiting.

tr_store( ) The tr_store operation illustrated below acquires ownership of the specified location in WRITE mode, and then records the location and value stored in its writeset.

```
void tr_store(tr_id_t id, trval_t *loc, trval_t v) {
    acquire_ownership(id,loc,WRITE);
    writeset_add(&TRAN[id].ws,loc,v);
}
```

-continued

```
trval_t tr_load(tr_id_t id, trval_t *loc) {
    trval_t v;
    if (writeset_lookup(&TRAN[id].ws,loc,&v))
        return v;
    acquire_ownership(id,loc,READ);
    readset_add(&TRAN[id].rs,loc);
    return *loc;
}
bool tr_validate (tr_id_t id) {
    return (TRAN[id].status==ACTIVE);
}
```

The acquire will silently succeed if the transaction already owns the location in WRITE mode, and will upgrade the ownership from READ mode to WRITE mode if necessary (as explained later). Because the writeset may only contain one pair (a, *) for any a, if the transaction previously stored a value to this location, that value is replaced by the new one.

tr_load( ) The tr_load operation illustrated above first checks to see whether the current transaction has already stored a value to the specified location, and if so returns the most recently stored value. Otherwise, the transaction acquires ownership of the location in READ mode (this will silently succeed if the transaction already owns the location), records in its readset that it has done so, and returns the value stored in the location.

tr_validate( ) The tr_validate operation illustrated above simply returns true if the transaction's status is still ACTIVE, and false otherwise (because in this simple version a transaction can still commit successfully if and only if its status is ACTIVE).

We do not address here how a thread chooses a transaction id to attempt to "claim". In general, persons of ordinary skill in the art may select any suitable method. A variety of alternatives are possible, for example, choosing ids at random. Another possibility is that each transaction id is associated—either statically or dynamically—with a particular thread; this reduces the cost of searching for a free transaction record, and in some case allows an optimization such that it is not necessary to use a CAS operation to change the transaction status from FREE to ACTIVE. One reason to apply such an optimization at least to some extent is that a thread that has just executed a transaction that was aborted will almost always retry that transaction, and will therefore again need to claim a transaction record; it clearly does not make sense to simply release the previous transaction record, and then start searching for another to claim.

tr_commit( ) The tr_commit operation illustrated below first attempts to atomically change its status from ACTIVE to COMMITTED using CAS. If this fails, either because the transaction has already been aborted before the transaction reads its status, or because the transaction is aborted before the transaction executes its CAS, then the transaction does not succeed. If it does succeed, the transaction then iterates over its writeset, copying the values it stored during its execution into the appropriate memory locations.

```
bool tr_commit(tr_id_t id) {
    trans_header_t old_th, new_th;
    bool succ = false;
    old_th = TRAN[id].header;
    if (old_th.status == ACTIVE) {
        new_th = old_th;
        new_th.status = committed;
```

-continued
```
            succ = CAS(&TRAN[i].header,old_th,new_th);
    }
    if (succ)
        simple_update(id);
    // Release ownerships - can't combine with loop in
    // simple_update because multiple locations in
    // transaction may map to same OWNER entry.
    owner_entry_t old_oe, new_oe;
    writeset_init_iterator(&TRAN[id].ws,&ws_iter);
    while (writeset_getnext(&TRAN[id].ws,&ws_iter,&lv))
        release_ownership(id, lv.loc);
    readset_init_iterator(&TRAN[id].rs,&rs_iter);
    while (writeset_getnext(&TRAN[id].ws,&rs_iter,&loc))
        release_ownership(id, loc);
    new_th.status = FREE;
    new_th.version++;
    TRAN[i].header = new_th;       // CAS not required for
                                   // simple blocking version
    return succ;
}
void simple_update(tr_id_t id) {
    // Commit succeeded; copy back new values - here we
    // just show a very simple method, which requires
    // others that wish to acquire locations owned by this
    // transaction (and those that map to the same OWNER
    // entries) to wait. Alternatives are discussed later.
    writeset_iterator_t ws_iter;
    readset_iterator_t rs_iter;
    tr_locval_t lv;
    tr_loc *loc;
    writeset_init_iterator(&TRAN[id].ws,&ws_iter);
    while (writeset_getnext(&TRAN[id].ws,&ws_iter,&lv))
        *(lv.loc) = lv.val;
}
```

Whether the transaction committed successfully or not, it iterates over its write and read sets, releasing ownership of each location, and then changes its status to FREE and increments its version number. In the simple blocking version, we do not need to use CAS to change the status from COMMITTED to FREE because no other transaction tries to change a transaction header when its status is COMMITTED; in the more complicated versions explained later, a CAS is used for this purpose. Finally, tr_commit( ) returns an indication of whether or not it succeeded.

Note that we do not combine the loop that releases locations owned in WRITE mode (i.e., those stored in the writeset) with the loop that copies back the stored values because multiple locations to which the transaction performed a store may map to the same ownership entry, and the transaction should retain ownership of each location until it has completed copying the stored value back to the location.

acquire_ownership( ) The acquire_ownership operation illustrated below repeatedly attempts to acquire ownership of the specified location for the specified transaction in the specified mode until it is successful (or it gives up trying due to a policy decision; this possibility is discussed further later).

```
void acquire_ownership(tr_id_t id, tr_val_t *loc,
                       int mode) {
    owner_entry_t old_oe, new_oe;
    while (true) {
        old_oe = OWNER[h(loc)];
        // Return immediately if already owned by me in
        // strong enough mode
        if (old_oe.id == id && old_oe.mode >= mode)
            return;
        if (policy decision)
            give up;
        bool ok_to_acquire = false;
```

-continued
```
        if (old_oe.id == id || old_oe.mode == UNOWNED)
            ok_to_acquire = true;
        else {
            // Location owned by another transaction
            trans_header_t old_th = TRAN[old_oe.id].header;
            case (old_th.status) {
                COMMITTED:
                    // wait for competitor to finish; see text
                    // for alternative approaches.
                    while (TRAN[old_oe].header==old_th);
                    break;
                ACTIVE:
                    if (policy decision) {
                        // attempt to abort competitor
                        trans_header_t new_th = old_th;
                        new_th.status = aborted;
                        CAS(&TRAN[old_oe.id].header,old_th,
                            new_th);
                    }
                    break;
                ABORTED:
                    // Nothing to do here, can just grab ownership
                FREE:
                    ok_to_acquire = true;
                    break;
            }
        }
        if (ok_to_acquire) {
            new_oe.mode = mode;
            new_oe.tran = id;
            new_oe.version = old_oe.version + 1;
            if (CAS(&OWNER[h(loc)],old_oe,new_oe))
                return;
        }
    }
}
```

The illustrated operation first reads the record of the OWNER table corresponding to the specified location, and checks to see if the specified transaction already owns the entry in a strong enough mode; if so, it returns immediately. Otherwise, it tries to determine whether it is safe to attempt to acquire ownership. If the entry is already owned by the current transaction (in a mode weaker than the required mode), or is unowned, then acquire ownership determines that it is safe to attempt to acquire ownership of the entry.

Otherwise, it reads the transaction status of the transaction that it observed to own the required entry. If that transaction is aborted, then it is safe to attempt to acquire ownership. However, as discussed previously, it is not generally safe to acquire an entry that is currently owned by a different committed or active transaction. If it is committed, then in this simple implementation, acquire ownership simply waits until that transaction has completed and changed the status of the transaction record back to FREE, and then retries. If the other transaction is active, then acquire_ownership can either wait for some time in order to allow the other transaction to complete, or it can attempt to abort that transaction. This is a policy decision, as discussed further below. In either case, acquire_ownership retries.

When acquire_ownership determines that it is safe to attempt to acquire ownership, it does so using CAS, and returns if successful. Note that upon acquiring ownership, it also increments the version number on the OWNER entry. This avoids an instance of the ABA problem, which could otherwise occur as follows: acquire_ownership determines that the transaction that currently owns the location is aborted, and therefore decides to attempt to take ownership from it. Then, before it can do so, the other transaction id is reused, with the possible result that acquire_ownership "steals" ownership from an active or committed transaction, which is not safe, as described above.

release_ownership( ) The release_ownership operation attempts to release ownership of the specified location using CAS, provided it is owned by the specified transaction. If the CAS fails, there is no need to retry, as this can happen only as a result of another transaction taking ownership of the location, in which case there is no longer any need to release it.

```
void release_ownership(tr_id_t id, tr_loc *loc) {
    owner_entry_t old_oe = OWNER[h(loc)], new_oe;
    if (old_oe.id == id) {
        new_oe = old_oe;
        new_oe.mode = UNOWNED;
        // Doesn't matter what new_oe.id is because
        // new_oe.mode = UNOWNED
        CAS(&OWNER[h(loc)],old_oe,new_oe);
    }
}
```

Properties of the Simple Word-Based Implementation

The word-based STM implementation described above is very simple because only the transaction that acquires ownership of a location can release it. Therefore, it is easy to see that a transaction maintains all its ownerships until it commits, and that it still has ownership of a location when it copies back a stored value to it. Together, these facts make it easy to see that the logical value of a location changes when and only when it should, and that the implementation is consistent with the semantics described above.

Nonetheless, several issues deserve further discussion, particularly with respect to what progress guarantees the implementation makes under what circumstances. First, this simple implementation is essentially based on locks: if a transaction owns a location and commits successfully, then all others requiring ownership of that location must wait until the first transaction releases it. If that transaction is delayed for a long time, then so are others requiring that location, and if the transaction stops executing completely, then no more progress can be made by other transactions requiring the location.

As with all lock-based algorithms, we assume that transactions (or threads executing them) do not permanently stop while in the midst of executing a transaction, and then evaluate the progress guarantees made by the implementation under that assumption. We further assume that every user transaction that is not aborted eventually invokes tr_commit( ). Given these two assumptions, we can now discuss the progress guarantees.

First, we observe that there is a risk of livelock, in which two or more transactions repeatedly abort each other, and thus none makes progress. Ideally, we would like to guarantee that any transaction that is retried repeatedly upon being aborted eventually commits successfully. We believe that, in practice, it is preferable to provide weaker guarantees in the face of contention, and to use contention control mechanisms to prevent the occurrence of livelock in practice. The reason is that, by considering weaker progress properties, we can achieve implementations that are substantially simpler, and therefore more efficient in the common, uncontended case. Furthermore, we have found that simple contention control mechanisms can be effective in preventing livelock in practice, while more sophisticated ones can guarantee that it does not occur (under certain weak and reasonable assumptions about the execution environment). The goal of this approach is to provide a strong enough progress guarantee in the underlying implementation that contention control mechanisms can facilitate progress.

The progress condition we considered when using this approach is obstruction-freedom. An implementation is obstruction-free if it guarantees that any transaction that is eventually retried without interference eventually commits successfully.

However, obstruction-freedom is a non-blocking progress condition: the failure of one transaction to take steps cannot prevent progress of another. Of course, our simple non-blocking implementation described above does not have that property, because if a transaction stops taking steps after it successfully commits, but before it sets its transaction status to FREE, then other transactions may be prevented from making progress, even if one of them runs without interference forever. However, we have designed the simple implementation described above so that this is the only source of blocking; we later describe various approaches to eliminating or mitigating the practical effects of such blocking.

Actually, another possible source of blocking is failure to return from tr_begin( ). This is essentially a resource allocation problem: if we want to guarantee that a transaction can eventually claim a transaction record, then we need to allocate a sufficient number of such records and coordinate them accordingly; we do not address this issue further here, as the issues involved are essentially the same as many other resource allocation problems.

We can characterize the progress guarantee of the simple implementation as follows: if a transaction eventually is retried without interference, then either it completes, or it encounters a transaction that has successfully committed. Because of our assumption that threads do not fail permanently while executing a transaction, if some transaction commits successfully, then the thread executing that transaction has made progress. Therefore, by combining the simple implementation with appropriate contention control mechanisms, we can achieve an implementation that does not livelock or deadlock. Such an implementation is useful for allowing programmers to experiment with transactional memory, and should be practical when used together with hardware TM to implement HybridTM in situations in which most transactions complete in hardware. However, if used in situations in which many transactions revert to software, then the fact that it is blocking may be problematic. Later, we discuss various approaches for overcoming this drawback by making the software nonblocking, as well as pragmatic approaches for largely eliminating the negative effects of blocking, while not eliminating it completely.

Contention Control

An important part of the design approach outlined above is how we combine our simple STM implementation with contention control mechanisms. We have shown in the exemplary code two places where "policy decisions" can be made. In the first, we might decide to give up trying to complete a particular transaction, for example to retry it using a different read sharing approach, as discussed further below. Another useful approach is to use the policy decision mechanism to reduce contention, simply by waiting for some time, or for some condition to hold, before proceeding with the current transaction. Similarly, in the second policy decision shown, a transaction can decide to wait for some time before aborting a competing transaction: the competing transaction may finish quickly, so aborting it would be unnecessary. We have shown these two places for policy decisions simply to illustrate the idea; many other possibilities exist. For example, we might consider "backing off" upon being aborted.

Variations on the Basic Word-Based STM Implementation

Based on this description, numerous variations on the above-described techniques will be appreciated by those skilled in the art. Below we briefly discuss a few of these.

If a transaction that is acquiring ownership of a location puts its own version number into the version number of the OWNER record (as opposed to incrementing the version number in the record), then it can "logically" release all locations it owns by incrementing its own version number, rather than by performing a CAS on each of the OWNER records it has acquired. Of course, this requires us to use the same number of bits for transaction version numbers as we do for version numbers in ownership records. This is a potentially significant optimization, but it complicates the code slightly, for example because checking whether an entry is currently owned necessitates reading the version number of the transaction that most recently owned it. As discussed below, this variation also has an impact on how we integrate hardware transactions with STM implementations. Finally, it introduces the possibility that locations that have not been modified for a long time might be acquired "silently" by a transaction when its version number wraps around. This does not cause incorrect behavior, but it does complicate reasoning about the algorithm somewhat. We have avoided this optimization in our presentation in order to keep it simple.

Threads can reuse transaction ids: they do not need to find a free transaction record and claim it for every transaction. This is especially useful for retrying failed transactions. A simple way to achieve this is to change a transaction record's status to ACTIVE rather than FREE when finishing tr_commit, and to record that the transaction is already claimed so that a subsequent call to tr_begin can avoid searching for a free transaction record and claiming it.

As presented so far, a transaction that is aborted releases all of its locations before returning. Often, the transaction will be retried, and will have to reacquire the same locations again. One reasonable optimization is to consider is retaining these ownerships, thereby saving the overhead of releasing and reacquiring such locations. As discussed below, we envisage retrying of a user transaction being controlled by the infrastructure that supports HybridTM, so such optimizations are easy to manage.

Word-Based HybridTM: Integrating HTM with STM

In the preceding section, we described implementations of software transactional memory that are designed to coexist with hardware transactions over the same transactable locations. In this section, we describe how this coexistence can be achieved.

One approach for allowing a mix of software and hardware transactions is to design the software transactions in such a way that hardware transactions can detect (potentially) conflicting software transactions, and abort. We aim to keep hardware transactions as simple as possible, so that the developed techniques will be useful for a wide variety of hardware transactional memory implementations, and so that they will be as efficient as possible when they do succeed, as they generally will in the common uncontended case. Therefore, we make only limited effort to ensure progress to transactions executed in hardware; if such transactions repeatedly fail, then we retry them in hardware some number of times, and then revert to retrying in software, where we can use a wider variety of contention control mechanisms to facilitate progress, as discussed above.

Therefore, our aim is to augment hardware transactions with just enough additional machinery to detect (potential) conflicts with concurrent software transactions. There are a variety of ways of doing so. For concreteness, we describe various techniques for integrating hardware transactions with software transactions based on the exemplary STM implementations described in the previous section. However, it will be appreciated by those skilled in the art that these ideas and variations on them can be applied to a variety of different STM implementations. For example, we later describe how similar ideas can be applied to achieve hardware-software hybrid versions of object based dynamic software transactional memory implementations.

The word-based STM implementations described in the previous sections include an OWNER array or similar structure. In some implementations, each transactable location a maps to a unique entry of this array h(a), and each software transaction that accesses a transactable location also takes ownership of that location by changing the value of OWNER [h(a)]. Thus, one way to integrate hardware and software transactions is to augment each hardware transaction that aims to access location a so that it also reads OWNER[h(a)], and determines whether a concurrent software transaction is accessing that location in a conflicting mode, aborting if so.

Figure 5:
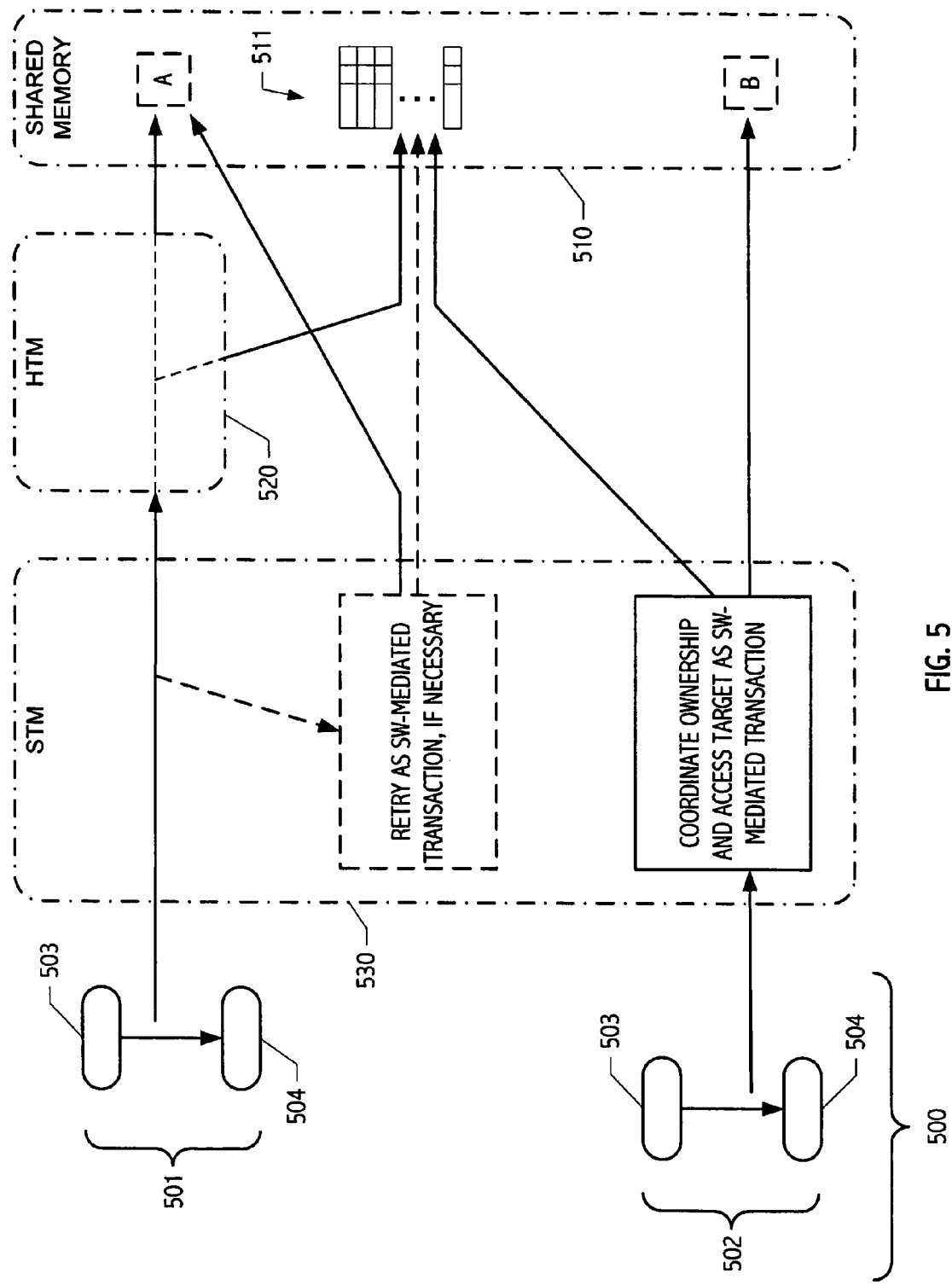
FIG. 5 illustrates coordination between a hardware-mediated transaction and a software-mediated transaction in accordance with some embodiments of the present invention.

FIG. 5 illustrates a concurrent computation 500 that includes at least two concurrently executing transactions, namely transactions 501 and 502, which each access transactable locations in shared memory 510. In general, in a course of computation from begin 503 to commit 504 or abort (not specifically shown), each of the transactions may access one or more transactable locations in shared memory. Transaction computations are in accordance with respective sequences of instructions executable on respective processors of a multiprocessor such as multiprocessor 100, previously described.

Software transactional memory (STM) 530 includes code, such as described above, which is executable on the multiprocessor. Hardware transactional memory (HTM) 520 includes architectural support (typically based on cache support) for coordinating amongst hardware-mediated transactions that access transactable locations in shared memory 510. A cache entry marking mechanism is one suitable supporting mechanism. Variations on such a cache entry marking mechanism are described in greater detail in the following commonly-owned, co-pending U.S. patent application Ser. Nos. 10/894,829, filed 20 Jul. 2004, entitled "Using Transactional Memory with Early Release to Implement Non-Blocking Dynamic-Sized Data Structure," naming Mark S. Moir and Maurice Herlihy as inventors, and 10/895,519, filed 20 Jul. 2004, entitled "Method and Apparatus for Releasing Memory Locations During Transactional Execution" and naming Mark S. Moir, Maurice P. Herlihy, Quinn A. Jacobson, Shailender Chaudhry, and Marc Tremblay as inventors. U.S. patent application Ser. No. 10/894,829 is incorporated herein by reference.

However, for purposes of the presently described invention, any of a variety of HTM designs and underlying mechanisms are possible. In general, the developed techniques are independent of any particular HTM techniques employed. Indeed, the developed techniques may be exploited in code and configurations in which HTM is exploited only if available or desired.

In general, STM 530 coordinates amongst software-mediated transactions and HTM 520 coordinates amongst hardware-mediated transactions. However, as previously described, by augmenting hardware-mediated transactions to include within their transactional scope entries of an ownership encoding maintained (by operation of STM 530) within the transactional space (e.g., in shared memory 510), coordination between STM 530 and HTM 520 can be achieved.

For purposes of illustration, transaction 501 accesses a set of transactable locations that includes transactable location A. Transaction 502 accesses a set of transactable locations that includes transactable location B. In general, transactions 501 and 502 conflict if they access, in conflicting modes, at least one common transactable location (e.g., if transactable locations A and B are the same or overlap). Transaction 501 is initially attempted as a hardware-mediated transaction, while transaction 502 is currently being executed as a software-mediated transaction.

Transaction 501 coordinates with any other hardware-mediated transactions via whatever mechanism hardware transactional memory (HTM) 520 provides. Software-mediated transactions are coordinated under control of a software transactional memory (STM) implementation 530, such as the word-based STM implementations described above. For example, in the illustrated configuration, an ownership encoding 511 (e.g., an OWNER array such as described above) is maintained in shared memory 510 in conjunction with STM operations (tr_load, tr_store, etc.). To coordinate HTM- and STM-mediated transactions (such as transactions 501 and 502, respectively), hardware-mediated transactions (e.g., transaction 501) that cover one or more transactable locations in 510 are augmented to include corresponding elements of ownership encoding 511 within their transactional scope. In this way, hardware-mediated transactions can be aborted in response to conflicting (or potentially conflicting) access by STM-mediated transaction (e.g., that of transaction 502). Of note, in the illustrated configuration, STM-mediated transactions are oblivious to HTM-mediated transactions. Instead, it is sufficient that augmented HTM-mediated transactions are aware of STM-mediated transactions. An alternative, though less convenient, approach would be for HTM 520 to maintain an ownership encoding accessible to STM-mediated transactions.

As long as hardware-mediated transactions are (or can be) augmented to include within their transactional scope corresponding elements of an ownership encoding maintained in correspondence with operation of the STM, coordination between hardware-mediated and software-mediated transactions can be provided. In general, this augmentation can be achieved using a variety of mechanisms, including by operation of a compiler or other code preparation environment, by operation of an execution environment (e.g., STM 530 acting as an intermediary or interface to HTM 520), or by operation of HTM 520, itself. In any case, if transaction 501 is aborted or repeatedly aborted (e.g., based on a conflict with a software-mediated transaction or another hardware-mediated transaction), the aborted transaction may optionally be retried as a software-mediated transaction.

Perhaps the most flexible way to cause hardware transactions to do the checking (described above) to coexist correctly with software transactions is to insert appropriate code using compilation or source code transformations. An advantage of this approach is that it is independent of hardware design, and therefore can be easily adapted to work with different STM implementations and with different HTM implementations and interfaces. Additionally, optimizations can be easily incorporated.

For clarity of description, we illustrate our augmentation techniques in the context of source code representations of transactional accesses; however, more generally, augmentation may be achieved for any of a variety of functional encodings of transaction accesses, including in source forms, in compiled code, in execution sequences of instructions, in functional sequences executable in the context of a virtual machine, etc. Based on the following description of code insertion techniques, persons of ordinary skill in the art will appreciate the desired augmentations and may adapt them for other implementations in which alternative augmentation mechanisms are employed.

Below we present simple examples that show how to integrate hardware transactions with software transactions based on the simple STM implementations outlined previously. In this case, a software transaction acquires exclusive ownership of each location that it accesses. Recall that in this simple case, ownership is held in either READ or WRITE mode; this allows hardware transactions to read locations that are being read by a concurrent software transactions without aborting. We demonstrate the modifications needed for hardware transactions via simple source code transformations. It is straightforward to see how the same effect can be achieved through compilation; later we discuss various optimizations that can be applied if this approach is chosen.

First, to detect conflicts between a read access by a hardware transaction and a store by a concurrent software transaction, we can apply transformations illustrated as follows. We transform a transactional load to be executed as part of a hardware-mediated transaction. For purposes of illustration, the to-be-transformed load corresponds to the following source code:

tmp = X;

where tmp is a local variable and X is a shared variable stored in a transactable location and is transformed into the following:

tmp = X;
if (OWNER[h(&X)].mode==WRITE)
abort;

The code sequence that includes the read access (of a transactable location corresponding to x) is augmented to further include a read access to the corresponding ownership encoding entry corresponding to X, i.e., a read access to OWNER[h(&X)]. In this way, the corresponding ownership record (which is maintained by STM in coordination with competing software-mediated transactions, if any) is included in the transactable location set of the executing hardware-mediated transaction. The load (and mode check predicate) allows the hardware-mediated transaction to abort if the transactable location corresponding to X is already owned in an incompatible mode (e.g., in WRITE mode) by a software-mediated transaction and further, causes the hardware-mediated transaction to abort if a transactable location corresponding to X is later accessed in a conflicting mode by a software-mediated transaction. As described above in the context of the exemplary word-based STM, such an access requires acquisition of ownership, which will update contents of OWNER[h(&X)]. Operation of HTM in response to this update of a transactional location within its augmented transactional scope can be conventional.

Similarly, in order to detect potential conflicts with stores executed by hardware transactions, we apply transformations illustrated as follows. We transform a transactional store to be executed as part of a hardware-mediated transaction. For purposes of illustration, the to-be-transformed store corresponds to the following source code:

X=5;

where X is a shared variable stored in a transactable location and where the statement is transformed into the following:

X = 5;
if (OWNER[h(&X)].mode != UNOWNED)
abort;

In short, the code sequence that includes the write access (of a transactable location corresponding to x) is augmented to further include a read access to the corresponding ownership encoding entry corresponding to X, i.e., a read access to OWNER[h (&X)]. In this way, the corresponding ownership record (which is maintained by STM in coordination with competing software-mediated transactions, if any) is included in the transactable location set of the executing hardware-mediated transaction. The load (and mode check predicate) allows the hardware-mediated transaction to abort if the transactable location corresponding to X is already owned (i.e., is not UNOWNED) by a software-mediated transaction and further, causes the hardware-mediated transaction to abort if a transactable location corresponding to X is later accessed by a software-mediated transaction. As described above in the context of the exemplary word-based STM, such an access requires acquisition of ownership, which will update contents of OWNER[h (&X)] and cause the hardware-mediated transaction to abort. Operation of HTM in response to this update of a transactional location within its augmented transactional scope can be conventional.

Code such as:

X=Y;

where X and Y are both shared variables can first be transformed to:

tmp=Y;

X=tmp;

where tmp is an unused local variable or register and then further transformed as described above for these simple cases. That is, tmp=Y;

if (OWNER[h(&Y)].mode==WRITE)

abort;

X=tmp;

if (OWNER[h(&X)].mode != UNOWNED)

abort;

If these transformations are performed by a compiler, then various optimizations are possible. For example, if the compiler can determine that a particular memory access has already been performed in the same transaction, then the checking code can be eliminated for all but the first such access.

The approach described above allows hardware and software transactions that access locations that map to disjoint sets of OWNER entries to proceed concurrently without interfering with each other. However, it also adds a nontrivial amount of checking code to each transaction to be executed in hardware.

If we incorporate into the STM implementation the variation described above, in which a software transaction can "logically" release all of its ownership simply by incrementing its version numbers, then such locations will look to hardware transactions augmented as described above as if they are being accessed by concurrent software transactions, when in fact they are not. While this does not affect correctness, it may have a significant impact on performance, because over time more and more hardware transactions would abort themselves because of the perceived conflict, and therefore retry in software. Several approaches to overcoming this problem are possible.

While this optimization may be desirable in implementations for systems that do not support hardware transactional memory, we might forgo it in implementations for systems that do have robust hardware transactional memory implementations, such that we expect the need to revert to software to be rare.

Alternatively, we may lazily release the apparent ownership of locations by old transactions. This can be done incrementally by transactions, or by low-priority background threads, or in response to some indication that too many hardware transactions are retrying. Many variations are possible.

Finally, we may enhance the augmentation of hardware transactions so that they look up the transaction record of the transaction that apparently owns a transaction in order to determine if the transaction has completed. This would result in more expensive code for hardware transactions. Below we discuss some approaches that can be used to mitigate the impact of this for applications in which software transactions are rare.

It is desirable to reduce the overhead of checking for compatibility with concurrent software transactions, especially if concurrent software transactions are rare, as we expect that they would be in a well designed application. As a general proposition, our goal is for most transactions to succeed in hardware, without resort to retrying in software.

One alternative for cases in which software transactions are expected to be rare is to maintain a global shared counter of the number of software transactions in progress. Given this, we can have versions of transactions to be executed in hardware that simply check that this counter is zero, and if so, proceed without any additional checking. In this case, the overhead of the checking is very small: transactions read one additional location, which is usually cached because it is usually zero and is modified rarely. Transactions that do not find the counter to be zero can still be executed as hardware transactions, but they then need to use a more fine-grained approach to checking, such as the one based on the OWNER array described above.

It will be appreciated by those skilled in the art that there is a wide variety of approaches to detecting conflicts, and to adapting between a range of granularity levels in order to keep overhead to a minimum while contention with software transactions is low, but to continue to allow fine-grained sharing between hardware and software transactions as the number of software transactions increases. For example, we can generalize the approach described above (using a single counter as well as a fine-grained detection mechanism like the OWNER array) to a hierarchy of conflict detection mechanisms. Furthermore, we can envisage contention detection based on semantic information rather than simple address comparisons. For example, software might (dynamically) designate all memory locations into "domains" so that, for example, a particular shared data structure or collection of data structures might constitute a domain. This way, hardware transactions can simply check a counter associated with a specified domain, and proceed without additional checking in the case that no concurrent software transactions are encountered in that domain. This approach has the advantage that if one data structure is heavily contended, or requires frequent access via software transactions, this need not affect the performance of other data structures. However, if programmers are required to designate these domains manually, then this approach shares with traditional lock-based techniques the problem that if the designation is done incorrectly, this can result in incorrect behavior.

Strategies for Achieving Non-Blocking STM

As discussed above, the simple STM implementation previously described has the disadvantage that a transaction is forced to wait when attempting to access a location in the case that it encounters another transaction that has committed and owns that location. This waiting can be particularly problematic if the committed transaction is preempted. In this section, we describe several techniques for overcoming this disadvantage.

Recall the following two observations, based on the definition of the logical value of a transactable location:
- if location a is owned by a committed transaction t that has a pair (a, v) for some v in its writeset, then storing v to location a while t still owns the location does not change the location's logical value.
- in the above situation, if location a still contains v, then revoking t's ownership of location a, either by giving ownership to some uncommitted transaction, or by making the location unowned, does not change the logical value of location a.

These observations support a strategy for allowing transactions to acquire ownership of locations they require, even without waiting for other transactions to release them: If we can ensure that a value stored by a transaction is copied back to the location to which it was stored by the transaction, and that no other value can overwrite this value before the committed transaction's ownership of the location is revoked, then an uncommitted transaction can acquire ownership of a location without waiting for the committed transaction that owns the location. The key difficulty in achieving this arises because we can potentially have multiple transactions, including the committed transaction that owns the location, attempting to copy a stored value back to its location. We need a way to ensure that none of these transactions belatedly stores the value after the ownership of the location has already been acquired from the committed transaction. If this happens, there is a risk of changing the logical value of the location at some point not associated with the successful commitment of a transaction.

Other STM implementations deal with this problem by copying values stored by a committed transaction back to their respective memory locations using CAS, and using version numbers or some other technique based on "stolen" bits in those memory locations to prevent the late copying mentioned above. However, our transparency goals generally preclude such options in STM implementations suitable for HybridTM. Below we describe several methods for preventing this late copying without violating the transparency requirement.

Non-Standard Hardware Support

As with many synchronization problems, we can easily address the issue mentioned above if we have hardware support for atomically accessing multiple memory locations. In fact, a very weak form of such support suffices in this case. Suppose we have a way to atomically check that one memory location contains a particular value while storing a value to another memory location. Such functionality is provided by any reasonable hardware transactional memory functionality, or by a hardware implementation of double-compare-and-swap (DCAS), but is in fact weaker than either of those and could therefore potentially be supported by simpler specialized hardware support.

We can use the functionality described above to atomically check that the transaction header (status and version number) of the transaction for which we are performing the copying has not changed while we copy back each value stored by the transaction. Then, having stored back all values for that transaction, we know that all of its values will remain in the appropriate locations until the status of the transaction changes (because all stores to a location owned by a committed transaction are of the unique value stored by the transaction to that location).

This approach is very simple, but has the disadvantage that it requires hardware support beyond what is available in today's architectures, so we cannot rely on this approach exclusively if we are to meet our goal of making it possible for programmers to use and test HybridTM before special hardware support is available. Therefore, we discuss alternative approaches below that do not require special hardware support.

First, however, we note that when hardware support for accessing multiple memory locations atomically (for example, some form of hardware transactional memory) is available, some care will still be required when using the approach described above. The reason is that most designs for hardware transactional memory do not guarantee forward progress at the hardware level: two conflicting transactions can repeatedly cause each other to fail, for example. However, we can imagine hardware transactional memory implementations (or implementations of weaker operations based on similar ideas) that do guarantee forward progress, at least in the absence of contention for the simple kinds of transactions mentioned above. In particular, to achieve an obstruction-free STM implementation, we only require that the transaction succeeds if it reads one location, compares the value read to a value in a register, and stores to another location, all while neither of these two locations is accessed concurrently. Most reasonable transactional memory implementations will provide such a guarantee, at least in practice: it could be that asynchronous events such as interrupts and preemption could occasionally cause such a transaction to fail. However, if we are to rely exclusively on this simple approach in an STM implementation, then it is important to ensure that such transactions do not deterministically fail even in the absence of interference, because in this case the STM implementation could "get stuck", with no may to make progress. In cases where such guarantees cannot be made, the simple and efficient mechanism outlined above can be combined with some of the other ones described below—which do not rely on non-standard hardware support—in order to ensure that there is always a way to make progress.

Finer Grained Locking

In the simple STM implementation described earlier, we can think of a committed transaction as holding a "lock" on all of the locations that it owns, because no other transaction that requires one of those locations can make progress until the committed transaction completes copying its stored values back to their respective locations and changes its status. In general, the negative effects of locks are most pronounced when they are held for a long time, and when they lock many locations.

These effects can be significantly mitigated by a "finer grained" locking strategy in which locks are held over fewer locations for less time. This reduces the likelihood of conflicts, and in some environments, allows threads to avoid being preempted while they hold the lock, provided the period of time for which they wish to avoid preemption is short. For example, the Solaris libraries provide the schedctl family of library functions, which allow threads to protect short critical sections of code from preemption, thereby avoiding the serious effects on performance that come with being preempted while holding a lock. Another possibility for avoiding preemption while holding a lock is to disable interrupts for a short time; this approach is most likely to be applicable to in-kernel implementations of HybridTM, where code is permitted to disable interrupts.

In this section, we describe a simple method for applying such techniques to the simple STM described earlier in order to prevent threads from having to wait for preempted threads to be rescheduled. The idea is to introduce a new LOCKED mode for entries in the OWNER table, which allows a transaction to "lock" an entry that is already owned, perhaps by another transaction. This provides an alternative method for storing a committed transaction's value back to a location while ensuring that the location is still owned by the committed transaction. Specifically, we can change the mode of the ownership entry associated with the location from WRITE to LOCKED, copy the committed transaction's value back to the location, and then change the ownership mode back to WRITE. After copying has been done, we can then change the status of the completed transaction, so that other transactions can take ownership of the locations it owns without risk of changing any logical values. Note that without additional checking, we cannot simply acquire ownership of the location, rather than putting it back into WRITE mode, because the committed transaction may have stored to other locations that map to the same ownership record.

Pseudocode illustrating this technique follows:

```
void locking_update(tr_id_t id, trans_header_t old_th) {
    writeset_iterator_t ws_iter;
    readset_iterator_t rs_iter;
    tr_locval_t lv;
    tr_loc *loc;
    owner_entry_t old_oe, new_oe;
    writeset_init_iterator(&TRAN[id].ws,&ws_iter);
    while (writeset_getnext(&TRAN[id].ws,&ws_iter,&lv)) {
        do {
            old_oe = OWNER[h(lv.loc)];
            if (TRAN[id].header != old_th || old_oe.id != id)
                return;
            new_oe = old_oe;
            new_oe.mode = LOCKED;
        } while (old_oe.mode == LOCKED ||
                 !CAS(&OWNER[h(lv.loc)],old_oe,
                      new_oe));
        *(lv.loc) = lv.val;
        OWNER[h(lv.loc)] = old_oe;
    }
    trans_header_t new_th = <COMPLETED,old_th.version>;
    CAS(&TRAN[id],old_th,new_th);
}
``` serve that the locking_update procedure accepts a parameter that indicates the previously-observed header of the committed transaction, allowing the locking code to ensure that it does not perform copying for a transaction that has already completed. Once a thread determines that all of the copying for a committed transaction has been completed, it attempts to update that transaction's status to COMPLETED; if the CAS fails, then some other transaction has already caused this transition. Once the transaction has the COMPLETED status, other transactions can acquire ownership of ownership entries it owns, of course provided they are not locked. We also require a committed transaction that is releasing its ownerships to wait until a locked ownership record is unlocked again. However, in both cases, because the lock is held for such a short time, we can use various techniques to avoid a thread being preempted while holding the lock, as described above, and therefore generally avoid the problem of waiting for a preempted thread.

Based on the descriptions herein, those skilled in the art will appreciate that the techniques described above can be further refined. For example, by extending the interface (and implementation) of write sets to allow a transaction to iterate over only the locations that map to a particular ownership entry, we can allow a transaction to perform only the amount of copying required to enable it to acquire the ownership entry it requires, rather than performing all copying for a transaction in order to acquire one location it owns. Furthermore, we can augment each writeset entry with a bit that indicates that the copying has already been performed, allowing transactions to avoid the overhead of redundant copying.

The approach described in this section is relatively simple and does not depend on non-standard hardware support. However, this approach also has the disadvantage that it increases the overhead of copying back values: in the simple blocking scheme presented previously, values are copied back using simple stores, while this approach requires a CAS to acquire the lock and then two stores, one for the copy and one to release the lock, even in the absence of contention. We would like to have the advantages of both schemes: we want efficiency in the common uncontended, unpreempted case, but we want to avoid transactions waiting for preempted transactions. In the next section, we describe an approach for achieving this best-of-both-worlds behavior.

Exploiting Operating System Scheduler Support

In this section, we describe how we can exploit scheduler-related operating system support to achieve the performance of the efficient and simple blocking scheme in the common case, while avoiding its primary disadvantage, namely that transactions have to wait for committed transactions that are preempted before acquiring locations they own. At a high level, a technique for achieving this is to allow the copying of values stored by a committed transaction to their respective memory locations to be performed in one of two modes: SINGLE or MULTIPLE.

In SINGLE mode, the copying is performed only by the committed transaction itself, and this is done using ordinary store instructions, more or less the same way as is done in the simple implementation presented earlier. In MULTIPLE mode, all transactions (including the committed transaction) use the short-lock approach described in the previous section. The idea is that, in the common case, when the committed transaction is not preempted, we can achieve the best performance by allowing the committed transaction to do its own copying as efficiently as possible. However, if the committed transaction is preempted, it is desirable to ensure that it does not prevent other transactions from making progress until it is rescheduled; we would prefer to switch to the more expensive MULTIPLE mode. The challenge is how to switch from SINGLE mode to MULTIPLE mode without violating correctness, and without causing one transaction to wait for another that is preempted. Below we explain how we can use scheduler support to achieve this.

We begin by describing how a transaction that wishes to copy values back to their respective memory locations on behalf of another committed transaction initiates the transition from SINGLE mode to MULTIPLE mode. Some solutions build on locking constructs that can be repeatedly acquired and released without the use of expensive synchronization primitives such as CAS while accessed only by a single thread, and can revert to standard (but more expensive) locking protocols when accessed by multiple threads. For example, suitable techniques for "revoking" a "biased" lock are disclosed in commonly-owned, co-pending U.S. patent application Ser. No. 10/669,948, filed 24 Sep. 2003, entitled "Quickly Reacquirable Locks" and naming David Dice, Mark S. Moir and William N. Scherer as inventors. In particular, we use an intermediate mode—STOPPED—to manage the transition. The reason is that we must ensure that the committed transaction that is using the simple store-based copying method has stopped using that method before we start using the fine-grained locking approach described in the previous section. A transaction that wishes to start using the lock-based approach changes the committed transaction's status from SINGLE to STOPPED, and the committed transaction changes the status to MULTIPLE mode to indicate that it has stopped using the simple store-based method. Subsequently all transactions (including the committed transaction itself) must used the lock-based method to complete copying the committed transaction's values.

The problem with the method as described so far is that it introduces another kind of blocking, namely that other transactions must wait for the committed transaction's indication that it is no longer using the store-based method. If the committed transaction has been preempted, then we again have the problem of waiting for a preempted transaction to be rescheduled. We use the scheduler support mentioned above to overcome this problem. Specifically, we allow threads to determine if another thread is currently preempted, and to ensure that threads are not rescheduled at the dangerous store instruction that would cause the incorrect behavior described above. We explain in more detail below.

The code that follows illustrates a stoppable_update procedure, which a committed transaction uses to copy back its values in SINGLE mode.

```
bool stoppable_update(tr_id_t id) {
        writeset_iterator_t ws_iter;
        readset_iterator_t rs_iter;
        tr_locval_t lv;
        tr_loc *loc;
        writeset_init_iterator(&TRAN[id].ws,&ws_iter);
        while (writeset_getnext(&TRAN[id].ws,&ws_iter,&lv)) {
L0:         if (TRAN[id].copymode == SINGLE)
L1:             *(lv.loc) = lv.val;
            else {
                TRAN[id].copymode = MULTIPLE;
                return false;
            }
        }
        return true;
}
```

This procedure returns true if it successfully completes the copying, and returns false in the event that it fails to complete the copying, and changes the transaction's copymode into MULTIPLE. In this case, the transaction retries the copying using the locking_update method.

Observe that, when executing the stoppable_update procedure, the committed transaction checks immediately before storing a value back to its memory location that it is still in SINGLE mode. If it is not, then it stores MULTIPLE to its copymode field, and returns false, allowing the transaction to invoke the locking_update method to cooperate with other transactions in copying back its values. Thus, the only risk that a committed transaction copies back a value using a simple store instruction after its copymode field has changed to STOPPED, is if this change happens after the committed transaction checks its copymode field at label L0, and before it performs the store at label L1. We can use scheduler support to ensure that the committed thread does not get rescheduled in this short region of code, and therefore it is safe for other threads to go ahead with using locking_update even before the committed transaction changes its copymode field to MULTIPLE. The way we achieve this is to install a kernel driver that examines a thread's program counter upon rescheduling that thread, and if the thread is in this "dangerous" interval of code, changes the thread's program counter to a convenient value outside this interval, for example to the instruction immediately after the store.

For a thread to determine that the thread executing the committed transaction will not subsequently execute the dangerous store, it must either see that the committed thread has changed its copymode to MULTIPLE, or it must know that the committed transaction will have its program counter modified if necessary by the scheduler hooks, as described above. For the latter case, it is sufficient to determine that the committed transaction is currently not running, and therefore will have its program counter changed appropriately if necessary when it is rescheduled.

Therefore, we need a way for one thread to determine that another thread is currently preempted. Here, we describe a simple way that such a determination can be made by using the scheduler hooks already described. In general, various execution environments may already provide support for making such a determination. Using special hooks to be executed when a thread is preempted and when it is rescheduled, it is a straightforward matter to record an indication of whether or not the thread is currently preempted or running. It is also straightforward for one skilled in the art to make an association between a thread and the transaction (if any) it is executing—or alternatively between a transaction and the thread that is executing it—in order to allow a thread that wants to determine if the thread executing a particular transaction is currently running.

Note that in the approach described above, we use the code executed upon preemption only to support the determination of whether another thread is currently preempted. In some circumstances, it may be unacceptable to execute additional code when preempting a thread, but acceptable to execute code when rescheduling a thread. An example is in priority-based (e.g., real-time) systems, where the preemption of a lower-priority thread should have minimal impact on the scheduling of a higher priority thread that has preempted it. In such cases, if some other means is provided by the operating system for determining that another thread is currently preempted, then we can adapt our technique to work without imposing any burden at preemption time.

Fraser-Harris Updating

Another approach for achieving a nonblocking STM implementation using the framework described herein is to apply a technique demonstrated by Fraser and Harris in an STM implementation used in their support for conditional critical regions in the Java programming language. See T. Harris and K. Fraser, *Language Support for Lightweight Transactions*, In *Proceedings of the* 18*th Annual ACM SIG-PLAN Conference on Object-Oriented Programming Systems, Languages, and Applications* (2003). In general, the technique involves a more complicated transactional framework than previously described, in which transactions maintain old values as well as new values in their writesets, with the understanding that the logical value of a location that is owned by an active transaction is the transaction's old value for that location. This approach allows a first transaction to take ownership of a location from a second transaction that is committed and has that location in its write set. Basically, the first location sets as its old value the new value of the second transaction, thereby avoiding changing the logical value of the location. Based on the description herein, persons of ordinary skill in the art will appreciate that these techniques, though more complicated, can be adapted to support the hybridTM implementations we have described. Such an approach provides a non-blocking STM implementation and does not depend on any special hardware support.

Strategies for Read Sharing

A set of transactions that do not modify any memory locations that they access in common should not interfere with each other's ability to commit successfully. For example, if the transactions are used to access a search tree, then successful searches do not modify the tree, and insertions and deletions may access different parts of the tree, though they will clearly all access the root. If the common read access to the root caused transactions to interfere with each other, this would severely limit the scalability of the implemented tree. Therefore, a mechanism for "read sharing" between transactions is desirable. In the simple STM presented above, read sharing is not supported, because exclusive ownership is required for each transactional access. However, this section describes techniques for implementing effective read sharing mechanisms for STM that are compatible with the HybridTM approach.

We begin by discussing a technique for implementing read sharing between transactions in purely software TM implementations. In this approach, a transaction that is reading a location (or opening an object for read-only access) simply records some information about the location that will be changed by any transaction that modifies the location. In the case of HybridTM implementations following the example presented in the previous sections, this means recording the version number of the corresponding ownership record. Then, as part of its attempt to commit, the transaction rereads this information, and validates that it has not changed for any of the locations being read. It can be shown in this case that the successful transaction can be linearized to a point at or before the first of the validating reads.

While the read sharing approach described above is simple, it has the drawback that the reads performed by one transaction are not "visible" to another. This causes a difficulty with regard to contention control: a software transaction that will cause another to abort by changing a location it has read cannot determine that it will do so, and therefore has no opportunity, for example, to back off and wait for that transaction to complete. In the context of HybridTM, this lack of visibility is even more problematic because it means that each hardware transaction must be augmented to modify the ownership record associated with each location that it modifies. Apart from the affect this would have on cache behavior and coherence traffic, it would also introduce "false sharing" between hardware transactions (i.e., two hardware transactions that do not naturally conflict might both access the same ownership record under this scheme, and therefore would conflict, causing at least one of them to abort). Clearly it would be desirable to avoid encumbering the performance of the common hardware transactions with such a technique.

An alternative approach to read sharing requires reads in software transactions to be visible. For the purposes of contention control, it may be desirable to maintain some information about transactions that are reading each location. This information might include a count of the number of such transactions, the maximum priority amongst such transactions, or even a list of all of them, and the choice affects the available methods for validating and committing transactions. There are various tradeoffs between the value of such information, and the cost of maintaining it. However, regardless of the best choice for contention control, the requirements for coordinating hardware and software transactions in HybridTM implementations are much simpler: we only need to be able to detect that some software transaction is reading a location, in order to abort any hardware transaction that attempts to modify that location. Below we describe some alternative approaches for facilitating such detection.

A first approach is to allow "shared" ownership between multiple transactions reading a location. Specifically, a transaction wishing to read a location, and finding the corresponding ownership record already owned by another transaction in read mode, could simply record the ownership record's version number and validate against the recorded value later, as described above. While this approach is simple, it does have one drawback. Consider the alternatives available to a transaction that owns a location in read mode, and has either aborted or committed. If it releases ownership of the location by changing the ownership record, then it also prevents other transactions that have read the location from committing successfully. On the other hand, if it leaves the record owned in read mode, then hardware transactions attempting to modify the location would always abort, with the result that such transactions would always be retried in software, which is clearly undesirable. Ideally, we would like to release ownership by the software readers only when all of them have finished. One approach to achieving this would be to maintain in the ownership record a count of the number of software transactions currently reading the location, and have hardware transactions abort if this count is non-zero. If software transactions are rare, this approach is acceptable. On the other hand, if a location is frequently accessed (for read only) by both hardware and software transactions, then updates to the counter would cause concurrent hardware transactions reading the location to abort. This can be overcome by keeping the count separate from an indication of whether the count is non-zero; hardware transactions would only read the latter.

Some care is required with this technique in order to maintain the non-zero indication correctly. The reason is that if a transaction decrements the count to zero, and then releases ownership of the ownership record, another transaction might in the meantime increment the count from zero to one, and therefore think that it has correctly registered itself as a reader. However, in this case, concurrent hardware transactions might see the location as unowned and modify it, which would violate correctness. One way to avoid this problem is to require transactions that will attempt to change the counter from zero to one to first either acquire the ownership record in read mode or increment its version number if it is already owned in read mode, and to verify that the record is still owned with the same version number after incrementing the counter. This prevents the race described above.

Strategies for Implementing Early Release

There are various benefits to be derived from the ability to "release" a location that has been read from (and not written to) from a transaction before the transaction attempts to commit, with the result that the transaction can still commit successfully even if that location changes before the transaction attempts to commit. In this case, the interface described above would be extended to provide a tr_release operation. If the hardware transactional memory supports early release, then transactions executed in hardware can directly use the hardware instruction for achieving early release. In this section, we briefly describe how software implementations can also support this functionality. We note that even if the hardware transactional memory does not support early release, we can simply ignore early release attempts while executing hardware transactions; this does not affect correctness, it simply negates the advantages that can be gained by using early release. Even if such calls are ignored in hardware, we can still support them in software.

The basic techniques for implementing early release are straightforward. The key idea is to ensure that future changes to the location to be released no longer cause the current transaction to fail to commit. This can be achieved, for example, by removing the associated record from the transaction's read set and releasing ownership of the appropriate entry of the OWNER array, so that transactions that subsequently acquire ownership of that entry do not have to wait (in the case of blocking STM implementations) or abort the releasing transaction (in the case of the nonblocking STM implementations). Of course, care must be taken to ensure that we do not release ownership of an entry until it is no longer mapped to by any location in the current transaction.

Strategies for Supporting Nested Transactions

A simple form of transaction nesting can be supported by maintaining a counter of the current transaction "depth". If we detect that a thread attempts to begin a transaction while it is already executing a transaction, then we simply increment this counter, and continue execution in the same transaction. Similarly, if a thread attempts to commit a nested transaction, we ignore the commit and continue execution. This way, all nested transactions become part of the top-level transaction: either they all commit as a single transaction, or none of them commit. We observe that we can use this technique to allow hardware transactions to be nested, even if the hardware transactional memory does not support nesting: we simply use compiler support to maintain the nesting level in software, and do not invoke the hardware transactional begin and commit instructions for nested transactions.

Integrating User Code with HybridTM

An application program making use of a HybridTM implementation should be able to execute each transaction in at least two different "modes": one that calls hardware transactional memory instructions directly, and another that uses STM through its defined interface, for example like the one presented above. Furthermore, there is a need for "wrapper" code around code for these different modes, for example that decides when to switch from retrying in hardware to trying in software, and also code for contention control.

Clearly, it is undesirable for application programmers to be required to write different versions of each transaction for these purposes, and to write the wrapper code that coordinates them. Therefore, it makes sense to have some linguistic construct for expressing the semantics of an atomic transaction over transactable locations, and to use automated system support to translate user transactions into the code required to coordinate the different modes. This disclosure focuses primarily on how transactions executed in different modes can be made to interoperate correctly; translations from user code to transaction code and wrapper code is beyond the scope of this invention. However, for concreteness and context, we briefly discuss some alternatives below.

One approach is to use compiler support to produce different code for different transaction modes, and to produce code that decides which modes to call under which circumstances. The advantage of this approach is that we can improve such compilation techniques over time, incorporate different contention control mechanisms, etc. The disadvantage is code growth: we may end up with several copies of the transaction code for every user-level transaction.

One alternative is dynamic compilation: we might produce the code at execution time only when it is required, taking into account available hardware support, application characteristics, etc. This approach has the advantage that a single executable can be used in different machines, so software that is running on a machine with no support for hardware transactional memory will immediately perform better when moved to a machine that does have such support, without the need for the user to recompile code.

Another alternative is to provide hardware support for executing transaction code in different modes. Depending on the mode chosen, the same code would behave differently. For example, in "hardware" mode, transactional load and store operations would directly execute appropriate hardware instructions for transactional load and store, as well as doing additional checking required to interoperate with software transactions. This would require the hardware to maintain state recording the location in memory of the OWNER array, its size, and how to treat values found in it. We could also have a variety of "software" modes, in which transactional instructions would instead be treated as procedure calls to the appropriate methods of the STM implementation. While such an approach would mitigate code growth, it is clearly much less flexible with respect to changing the STM implementation and how software transactions interact with hardware ones.

Furthermore, there may be opportunities for applying different compiler optimizations to transactions depending on the mode in which they are executed. For example, if the compiler can determine that a particular memory location being read has not previously been stored by the same transaction, then it could call a "lightweight" version of the tr_read operation, which would not search the transaction's writeset.

For another example, if a particular location is accessed (either loaded or stored) once, and is subsequently loaded again by the same transaction, then the compiler can store the relevant value in a register, thereby avoiding the need to search the writeset.

Another example concerns the handling of read validation. As discussed earlier, a conservative approach to avoiding incorrect behavior in software transactions that are doomed to fail is to call tr_validate after every tr_read operation, discontinuing execution of user transaction code if the validation fails. In some cases, a compiler can prove that a particular part of a transaction will not cause any incorrect behavior even if the transaction is already doomed to fail. For example, in some cases, we need not validate after each of a series of consecutive tr_load operations; it is sufficient to validate after the last one.

Alternative Framework for Word-Based Hybrid Transactional Memory

The preceding description includes a framework for implementing word-based hybrid transactional memory that is based on each transaction maintaining a write set: a set of locations modified by the transaction and which values were written. After the transaction commits, these values are copied from the write set to the actual memory locations accessed. Here we briefly describe an alternative approach that builds on an undo set.

Rather than storing values to be written in a write set, it is possible to instead store the values directly in the memory locations accessed, while maintaining an undo set for each transaction. In this case, the logical value of a location is the contents of the location unless there is an active transaction that owns the location and has a value v in its undo set for that location, in which case the logical value is v.

In this way, a commit is very cheap (simply a CAS to change the transaction's status), while the burden of copying values from a transaction's set to the memory locations accessed is required only in the hopefully less frequent case of an aborted transaction. The problem of copying values from the undo set back to the memory locations upon abort is very similar to the problem of copying values from the write set to the locations accessed upon commit in the write-set scheme. Based on the description herein, the ideas presented above can easily be adapted for this purpose.

Another advantage of the undo set approach is that transactional reads can access the memory location directly, without having to search the write set for a value already written by the transaction. This advantage may be offset, in part, by possible compiler optimizations, such as those previously described.

Object-Based Hybrid Transactional Memory

While the preceding description has focused primarily on a "word-based" style of hybrid transactional memory, similar ideas and techniques can be applied to "object-based" hybrid transactional memory, based on Dynamic Software Transactional Memory (DSTM) implementations such as those described in commonly-owned, co-pending U.S. patent application Ser. No. 10/621,072, filed Jul. 16, 2003, entitled "Software Transactional Memory for Dynamically Sizable Shared Data Structures," and naming Moir, Luchangco and Herlihy and inventors, which is incorporated herein by reference. In short, coordination provided using an OWNER table of the previously described STM implementations may instead by provided using other similar structures. For example, locator objects used by the DSTM implementations of U.S. patent application Ser. No. 10/621,072 may be employed to coordinate hardware-mediated and software-mediated transactions.

In particular, building on the techniques described herein, hardware transactions can be used to effect modifications to objects without the copying usually required by purely software implementations, while still supporting software transactions that copy objects in order to effect atomic transactions. To achieve this, an OWNER table is not needed, because the start block (or the locator itself if the start block is eliminated as discussed below) can be used for the same purpose: hardware transactions that modify part of an object will also read the start block (or locator) in order to detect any concurrent software transactions. In this case, transactions that access an object for reading only will need to indicate their presence, for example via a bit in the start block or locator, so that hardware transactions can detect conflicts with them. In some variations on the object-based STM, transactions reading an object can be detected anyway; in others, simple modifications would be required to support this. One approach is to have the first transaction to open an object for reading set a bit in the start block or locator to indicate that it is doing so.

In general, additional indirection introduced using start blocks in the DSTM implementations can be eliminated since hardware transactional memory can be used to modify multi-word quantities such as locator records directly as long as the hardware transactional memory provides sufficient forward progress guarantees. For example, it is sufficient that a hardware transactional memory implementation guarantee completion for any hardware transaction that accesses only a single cache line and commits within a small number of instructions. Alternatively, if such guarantees are not provided by the hardware transactional memory, it is possible to instead use a word-based hybrid transactional memory implementation such as those described above to access locators. This would have the advantage of fast execution in the common case, while allowing software mechanisms to intervene in the case that progress cannot be made using hardware transactional memory for some reason.

OTHER EMBODIMENTS

While the invention(s) is(are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. In addition, more complex shared object structures may be defined, which exploit the techniques described herein. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A computer system, comprising:
   one or more processors; and
   a memory comprising a shared transactional memory space accessible by the one or more processors using both hardware transactional memory (HTM) transactions and software transactional memory (STM) transactions; and
   a hybrid transactional memory coordination mechanism configured to coordinate between concurrent HTM and STM transactions over the shared transactional memory space;
   wherein atomicity of and coordination amongst HTM transactions are mediated in hardware without the use of the hybrid transactional memory coordination mechanism.

2. The computer system of claim 1, wherein the hybrid transactional memory coordination mechanism is configured to preferentially execute a given transaction that is executable as either an HTM or STM transaction as an HTM transaction.

3. The computer system of claim 1, wherein the hybrid transactional memory coordination mechanism is configured to retry at least some unsuccessful HTM transactions as semantically-equivalent STM transactions.

4. The computer system of claim 1, wherein the hybrid transactional memory coordination mechanism is configured to retry an unsuccessful HTM transaction one or more times and, if the one or more retries are also unsuccessful, the hybrid transactional memory coordination mechanism is configured to retry the unsuccessful HTM transaction as a semantically-equivalent STM transaction.

5. The computer system of claim 1, wherein the hybrid transactional memory coordination mechanism is configured to retry a conflicted-with HTM transaction one or more times and, if the one or more retries are unsuccessful, the hybrid transactional memory coordination mechanism is configured to retry the conflicted-with HTM transaction as a semantically-equivalent STM transaction.

6. The computer system of claim 1, wherein the hybrid transactional memory coordination mechanism is configured to retry at least some unsuccessful STM transactions as semantically-equivalent HTM transactions.

7. The computer system of claim 1, wherein the hybrid transactional memory coordination mechanism is further configured to encode current ownership by the STM transactions of transactable locations, wherein the current ownership encodings, if any, corresponding to transactable location targets of a particular HTM transaction are usable to be read in the course of the particular HTM access to detect conflict, if any, with concurrently executing ones of the STM transactions.

8. The computer system of claim 1, wherein the hybrid transactional memory coordination mechanism is further configured to, for a particular HTM transaction, check for STM transaction ownership, if any, of transactable locations that are targets of the particular HTM transactions.

9. The computer system of claim 1, further comprising:
a conflict resolution mechanism configured to retry a conflicted-with HTM transaction.

10. The computer system of claim 1, further comprising:
a conflict resolution mechanism configured to retry a conflicted-with HTM transaction as a semantically-equivalent STM transaction.

11. The computer system of claim 1, further comprising:
a transactable location ownership record maintained in correspondence with STM accesses to the transactional memory space.

12. The computer system of claim 11, wherein the transactable location ownership record is configured to implement a hash from one or more transactable location addresses to respective transactable location ownership record entries.

13. The computer system of claim 11, wherein the hybrid transactional memory coordination mechanism comprises HTM accesses that are augmented to include in their transactional scope at least a portion of the transactable location ownership record maintained in correspondence with concurrent STM accesses to the transactional memory space.

14. The computer system of claim 11,
wherein transactable locations reside in the shared transactional memory space addressable by the one or more processors; and
wherein the transactable location ownership record also resides in the shared transactional memory space.

15. The computer system of claim 11, wherein the transactable location ownership record is organized as a set of entries that each encode for a respective set of one or more of the transactable locations, an ownership status with respect to active STM accesses.

16. The computer system of claim 1, wherein at least some instruction sequences configured for execution on the one or more processors include for a given transaction, semantically-equivalent STM transaction and HTM transaction encodings.

17. A method of operating a computational system, the method comprising:
executing a first transaction against a transactional memory space, the first transaction executing under control of a software transactional memory (STM) facility, wherein the STM facility ensures atomicity of STM transactions using one or more software synchronization constructs;
executing, concurrently with the first transaction, a second transaction against the transactional memory space, the second transaction being presented to a hardware transactional memory (HTM) facility, wherein the HTM facility ensures atomicity of HTM transactions using hardware and without using software synchronization constructs;
coordinating operation of the first transaction and the second transaction using a hybrid transactional memory coordination mechanism;
wherein the first and the second transactions access at least one common transactable location.

18. The method of claim 17, further comprising:
coordinating the first and concurrent second transactions using a transactable location ownership encoding maintained in correspondence with STM transactions against the transactional memory space.

19. The method of claim 18,
wherein the second transaction targets one or more particular transactable locations; and
wherein the method further includes detecting if any conflicts exist between the first and second transactions by including in transaction scope of the second transaction those entries of the transactable location ownership encoding which map from the transactable locations.

20. The method of claim 19, wherein the second transaction is retried in response to detecting that a conflict exists.

21. The method of claim 17, wherein transactable locations of the transactional memory space map to entries of a transactable location ownership record.

22. The method of claim 21, wherein two or more of the transactable locations map to each of the entries of the transactable location ownership record.

23. The method of claim 17, wherein, in response to at least some conflicts between the second transaction and a third transaction, the second transaction is reevaluated as a fourth transaction of substantially identical semantics and executed under control of the software transactional memory (STM) facility.

24. The method of claim 23, wherein the conflicting third transaction executes under control of the software transactional memory (STM) facility.

25. The method of claim 23, wherein the conflicting third transaction executes under control of the hardware transactional memory (HTM) facility.

26. An apparatus comprising:
one or more processors;
a shared memory accessible by the one or more processors and configured to allow concurrent access by threads executable on respective ones of the processors;
a hardware transactional memory (HTM) interface to a transaction space defined in the shared memory, the HTM interface comprising hardware coupled between the one or more processors and the shared memory and configured to coordinate amongst concurrent HTM transactions without using software synchronization constructs;
a transactable location ownership data structure instantiated in the shared memory to track ownership status of transactable locations in correspondence with execution of software transactional memory (STM) transactions targeting transactable locations in the transaction space;

a hybrid transactional memory coordination mechanism configured to cause the hardware transactional memory (HTM) interface to treat those entries, if any, of the transactable location ownership encoding corresponding to targets of a HTM transaction as within the apparent scope of the HTM transaction to allow the HTM interface to detect conflict, if any, with concurrently executing ones of the STM transactions.

27. The apparatus of claim 26, wherein the coordination mechanism includes HTM transaction code augmented to read the corresponding entries.

28. The apparatus of claim 26, wherein the transactable location ownership encodings, if any, corresponding to targets of a particular HTM transaction are usable to be read in the course of the particular HTM transaction to detect conflict, if any, with concurrently executing ones of the STM transactions.

29. The apparatus of claim 26, wherein, for a particular HTM transaction, the coordination mechanism is configured to check for STM transaction ownership, if any, of transactable locations that are targets of the particular HTM transaction.

30. The apparatus of claim 26, further comprising:
a retry mechanism configured to retry an unsuccessful HTM transaction.

31. The apparatus of claim 26, further comprising:
a retry mechanism configured to retry an unsuccessful HTM transaction as a semantically-equivalent STM transaction.

32. The apparatus of claim 31, wherein the unsuccessful HTM transaction is a conflicted-with HTM transaction.

33. The apparatus of claim 26, wherein the transactable location ownership data structure is organized as a table that implements a hash from one or more transactable location addresses to respective transactable location ownership table entries.

34. The apparatus of claim 26, wherein the transactable location ownership data structure is organized as a set of entries that each encode for a respective set of one or more of the transactable locations, an ownership status with respect to active STM transactions.

35. The apparatus of claim 26, wherein two or more of the transactable locations map to a given entry of the transactable location ownership data structure.

36. A method of making a computer program product for execution in a computer system that supports coordinated hybrid HW/SW transactional memory, the method comprising:
preparing an executable functional sequence corresponding to a source representation of code that includes a transaction construct; and
including in the executable functional sequence two alternative functional encodings corresponding to the transaction construct,
wherein a first alternative functional encoding includes a software transactional memory (STM) encoding that includes operations to maintain, for targets of the transaction construct, entries of a transactable location ownership encoding in correspondence with execution of the transaction construct using an STM interface, and
wherein a second alternative functional encoding causes a hardware transactional memory (HTM) interface to treat those entries, if any, of the transactable location ownership encoding corresponding to targets of the transaction construct as within the apparent scope of the transaction construct in correspondence with execution of the transaction construct using the HTM interface.

37. The method of claim 36, wherein the second alternative functional encoding is augmented to include the corresponding entries of the transactable location ownership encoding as read targets of the transaction construct when executed by the hardware transactional memory (HTM) interface.

38. The method of claim 36, further comprising:
introducing a source-form representation of the alternative functional encodings into the source representation of code; and
thereafter compiling the source representation of code to produce the executable functional sequence.

39. The method of claim 36, wherein the preparing and including are performed, at least in part, by a compiler.

40. The method of claim 36, wherein the including is performed, at least in part, by an execution environment.

41. The method of claim 40, wherein the execution environment includes a just-in-time (JIT) compiler.

42. A computer-readable storage medium, comprising program instructions configured to implement:
a hardware transactional memory (HTM) sequence executable in a multithreaded computational environment that supports both HTM accesses and software transactional memory (STM) accesses to a single transactional memory space,
wherein the HTM sequence causes a corresponding HTM access to include in its apparent transactional scope at least a portion of a transactable location ownership encoding maintained in correspondence with concurrent STM accesses to the transactional memory space to allow a hybrid transactional coordination mechanism of a HTM interface to the transactional memory space to detect conflict, if any, with concurrently executing STM transactions; and
wherein the HTM interface is configured to coordinate amongst concurrent HTM accesses without using software synchronization constructs.

43. The storage medium of claim 42, wherein the program instructions are further configured to implement:
an STM sequence corresponding to the HTM sequence and executable in the multithreaded computational environment.

44. The storage medium of claim 42, wherein the program instructions are further configured to implement:
a retry mechanism configured to retry an unsuccessful execution of the HTM sequence using a corresponding STM sequence.

45. The storage medium of claim 44, wherein to retry the unsuccessful execution of the HTM sequence, the retry mechanism is configured to retry a conflicted-with execution of the HTM sequence using the corresponding STM sequence.

46. The storage medium of claim 42, wherein the storage medium is selected from the set of a disk, a tape, a magnetic storage medium, an optical storage medium, and another electronic storage medium.

47. A computer-readable storage medium, comprising program instructions configured to implement:
corresponding software transactional memory (STM) and hardware transactional memory (HTM) sequences, wherein either or both of the STM and HTM sequences are executable in a particular multithreaded computational environment and wherein each corresponds to a same transactional access to be performed, wherein the HTM sequence causes a corresponding HTM transaction to include in its apparent transactional scope at least a portion of a transactable location ownership encoding maintained in correspondence with concurrent STM accesses, if any, to a transactional memory space to allow a hybrid transactional memory coordination mechanism of a HTM interface to the transactional memory space to detect conflict, if any, with concurrently executing STM transactions; and wherein the HTM interface is configured to coordinate amongst concurrent HTM accesses without using software synchronization constructs.

48. The storage medium of claim 47, wherein the program instructions are further configured to implement:

a retry mechanism that eventually retries an unsuccessful execution of the HTM sequence using the corresponding STM sequence.

49. The storage medium of claim 48, wherein the retry mechanism eventually retires a conflicted-with execution of the HTM sequence using the corresponding STM sequence.

50. The storage medium of claim 47, wherein the storage medium is selected from the set of a disk, a tape, a magnetic storage medium, an optical storage medium, and another electronic storage medium.

51. An apparatus comprising:

at least one processor including an interface comprising hardware configured to coordinate amongst hardware-mediated transactions in a hardware transactional memory (HTM) without using software synchronization constructs;

means for storing code executable on the processor to provide a software transactional memory (STM) interface, wherein the STM interface ensures atomicity of STM transactions using one or more software synchronization constructs; and means for coordinating operation of the hardware transactional memory and the software transactional memory interface for concurrent hardware-mediated and STM transactions targeting overlapping sets of transactable locations.

52. The apparatus of claim 51, wherein the means for coordinating includes means for including within the apparent scope of an HTM access, a transactable location ownership record maintained in correspondence with operation of STM accesses.

53. The apparatus of claim 51, further comprising:

means for retrying an unsuccessful execution of an HTM sequence using a corresponding STM sequence.

* * * * *